US011362830B2

(12) United States Patent
Kanbe

(10) Patent No.: US 11,362,830 B2
(45) Date of Patent: Jun. 14, 2022

(54) MEMORY SYSTEM

(71) Applicant: Toshiba Memory Corporation, Minato-ku (JP)

(72) Inventor: Yuki Kanbe, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 443 days.

(21) Appl. No.: 16/517,906

(22) Filed: Jul. 22, 2019

(65) Prior Publication Data
US 2020/0244458 A1    Jul. 30, 2020

(30) Foreign Application Priority Data

Jan. 24, 2019  (JP) .............................. JP2019-010138

(51) Int. Cl.
| | |
|---|---|
| *H04L 29/06* | (2006.01) |
| *H04L 9/32* | (2006.01) |
| *G06F 3/06* | (2006.01) |
| *H04L 9/08* | (2006.01) |
| *G06F 21/60* | (2013.01) |
| *G06F 21/62* | (2013.01) |

(52) U.S. Cl.
CPC .......... *H04L 9/3226* (2013.01); *G06F 3/0604* (2013.01); *G06F 3/0659* (2013.01); *G06F 3/0679* (2013.01); *G06F 21/602* (2013.01); *G06F 21/6218* (2013.01); *H04L 9/0869* (2013.01)

(58) Field of Classification Search
None
See application file for complete search history.

(56) References Cited

U.S. PATENT DOCUMENTS

| | | | |
|---|---|---|---|
| 8,417,967 B2 | 4/2013 | Foster et al. | |
| 9,117,062 B1 * | 8/2015 | Fitch | ............... H04L 63/08 |
| 2005/0197102 A1 * | 9/2005 | Kim | ............... H04W 8/183 |
| | | | 455/410 |
| 2006/0129824 A1 * | 6/2006 | Hoff | ............... H04L 9/3234 |
| | | | 713/176 |

(Continued)

FOREIGN PATENT DOCUMENTS

| | | | | |
|---|---|---|---|---|
| EP | 0388841 B1 * | 10/1994 | ....... | G07B 17/00733 |
| JP | 2002-352155 | 12/2002 | | |

(Continued)

*Primary Examiner* — Andrew J Steinle
(74) *Attorney, Agent, or Firm* — Oblon, McClelland, Maier & Neustadt, L.L.P.

(57) ABSTRACT

A memory system is communicable with a plurality of hosts. The memory system includes a nonvolatile memory and a controller electrically connected to the nonvolatile memory. The controller receives an authentication request command from a first host, and transmits a first authentication code when authentication of the first host is successful. The controller receives an access command, which includes a second authentication code, for accessing the nonvolatile memory from a second host. The controller permits an access to the nonvolatile memory in accordance with the access command when the second authentication code matches the first authentication code, and prohibits an access to the nonvolatile memory in accordance with the access command when the second authentication code is different from the first authentication code.

20 Claims, 13 Drawing Sheets

(56) References Cited

U.S. PATENT DOCUMENTS

| | | | |
|---|---|---|---|
| 2015/0256333 A1* | 9/2015 | Hashimoto | H04N 21/835 |
| | | | 713/168 |
| 2016/0103625 A1 | 4/2016 | Fujimoto et al. | |
| 2017/0091123 A1* | 3/2017 | Sato | G06F 12/1441 |
| 2018/0189195 A1 | 7/2018 | Chun et al. | |

FOREIGN PATENT DOCUMENTS

| | | |
|---|---|---|
| JP | 5613596 | 10/2014 |
| TW | 201616390 A | 5/2016 |
| TW | 201826128 A | 7/2018 |

* cited by examiner

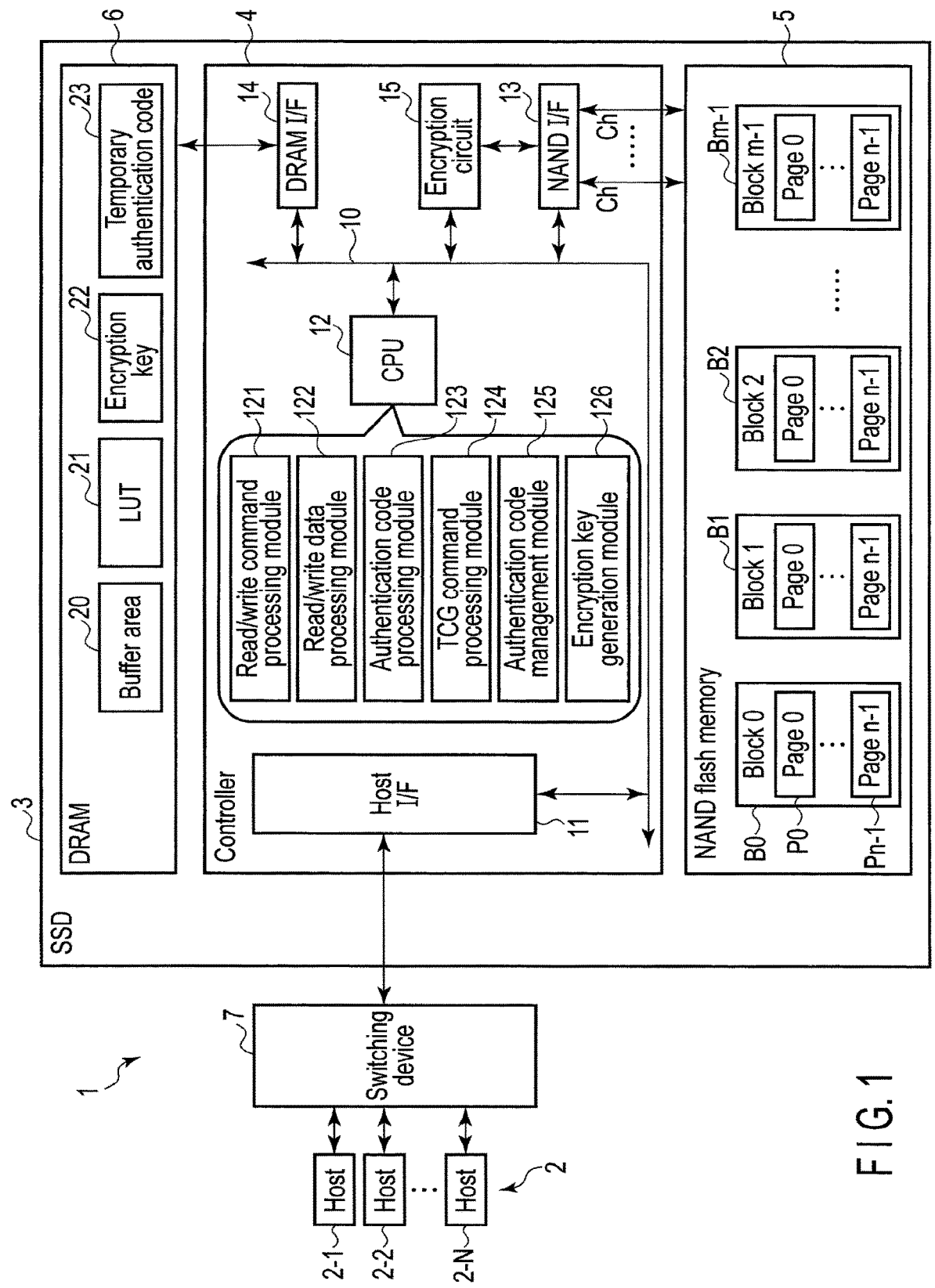
F I G. 1

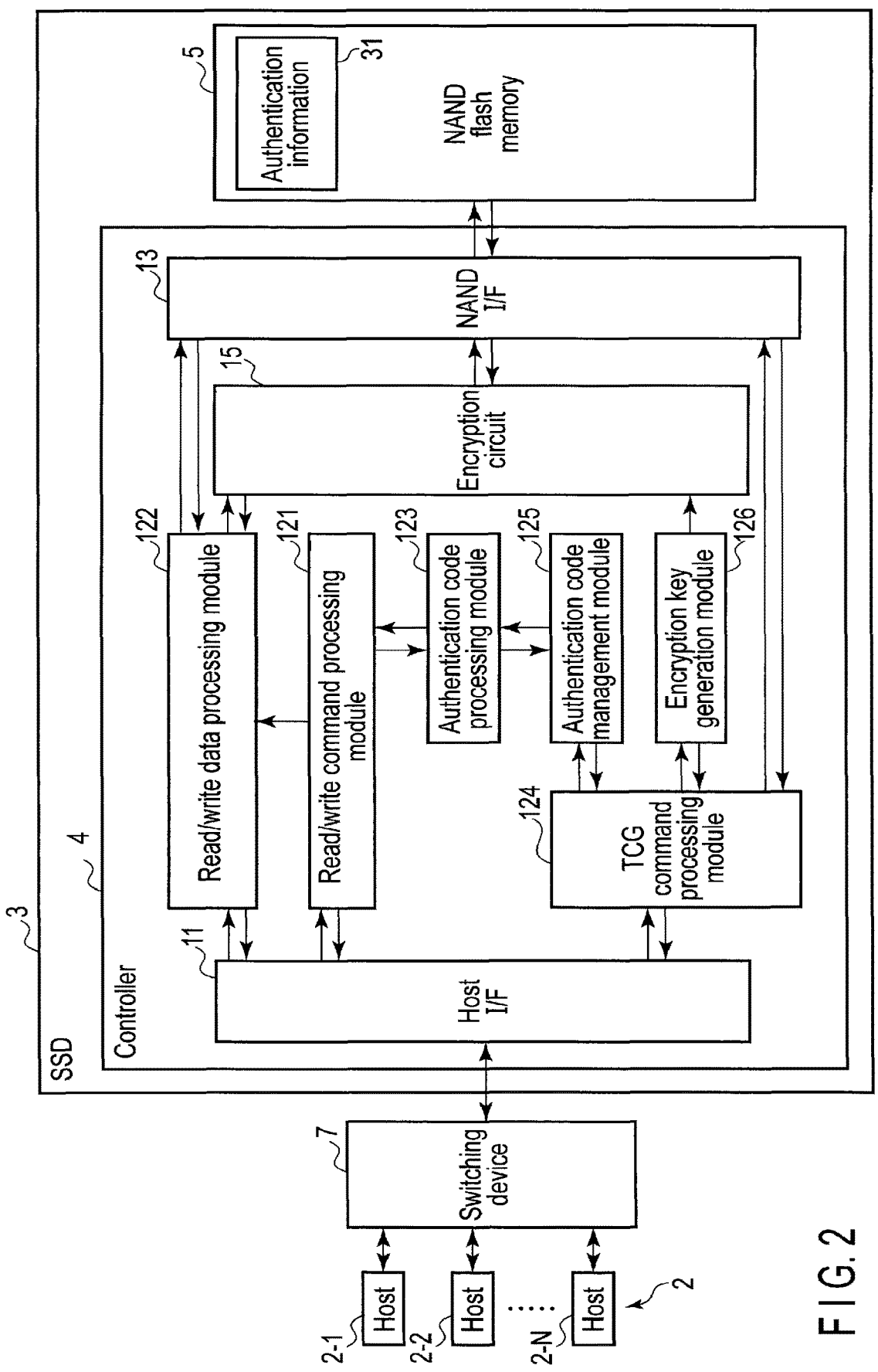
F I G. 2

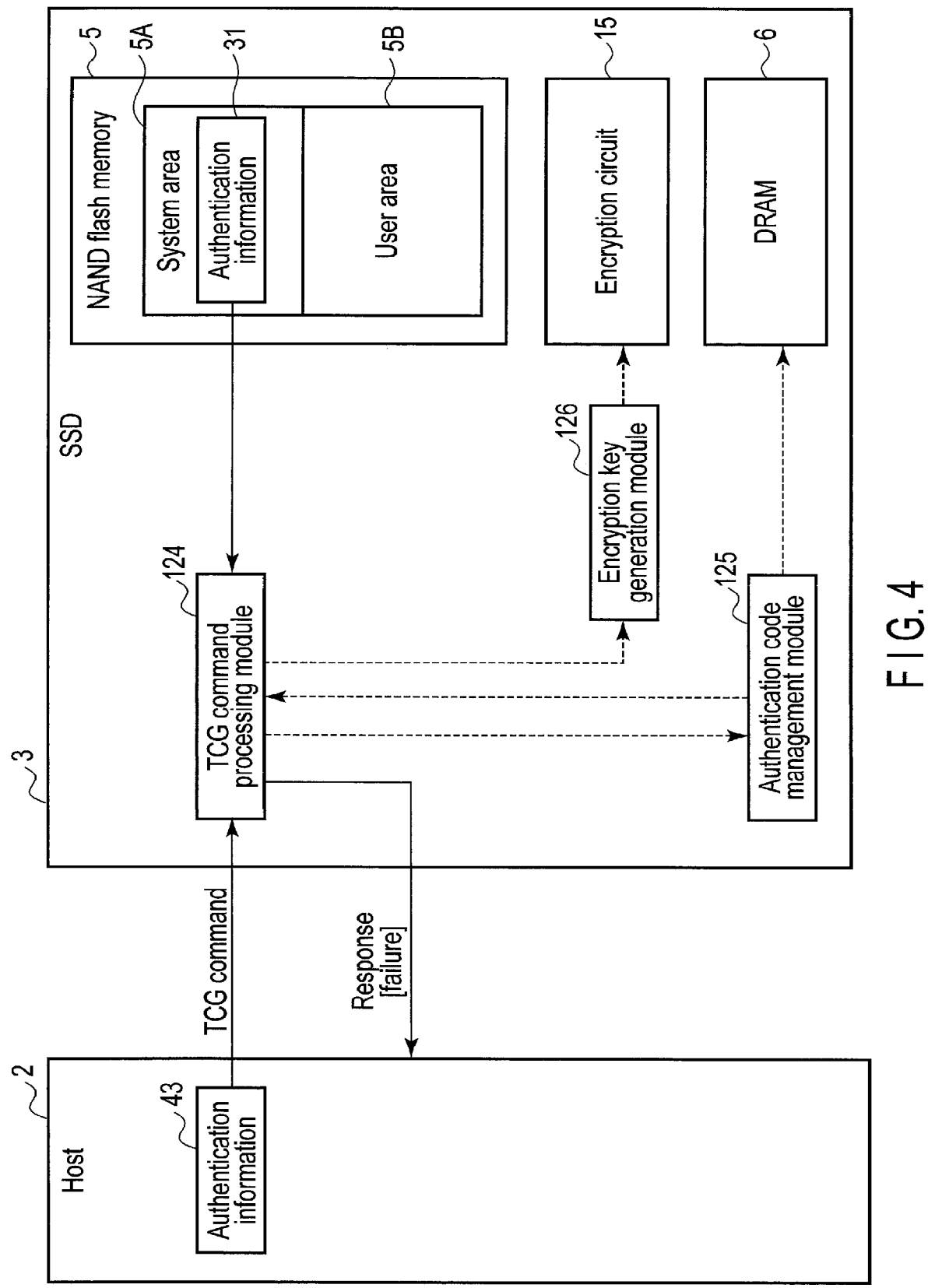
F I G. 4

| Size (Bytes) | Item | Specific example | Explanation |
|---|---|---|---|
| 8 | MethodUID | 00 00 00 06 00 00 00 0C (Authenticate) | Indicating that authentication is requested |
| 8 | Authority | 00 00 00 09 00 00 80 01 (BandMaster 0) | Indicating authority to be authenticated |
| 32 | PIN | 61 61 61 ... 61 ("aaa...a") | Indicating PIN (password) |

F I G. 5

| Size (Bytes) | Item | Specific example | Explanation |
|---|---|---|---|
| 1 | Authentication result | 01 (Success) | Authentication success (PIN matching) or failure |
| 32 | Temporary authentication code | 61 62 63 ... 30 ("abc...0") | Information for access to storage given to host whose authentication is successful |
| 3 | Method status | 00 00 00 (SUCCESS) | Error status of command itself |

F I G. 6

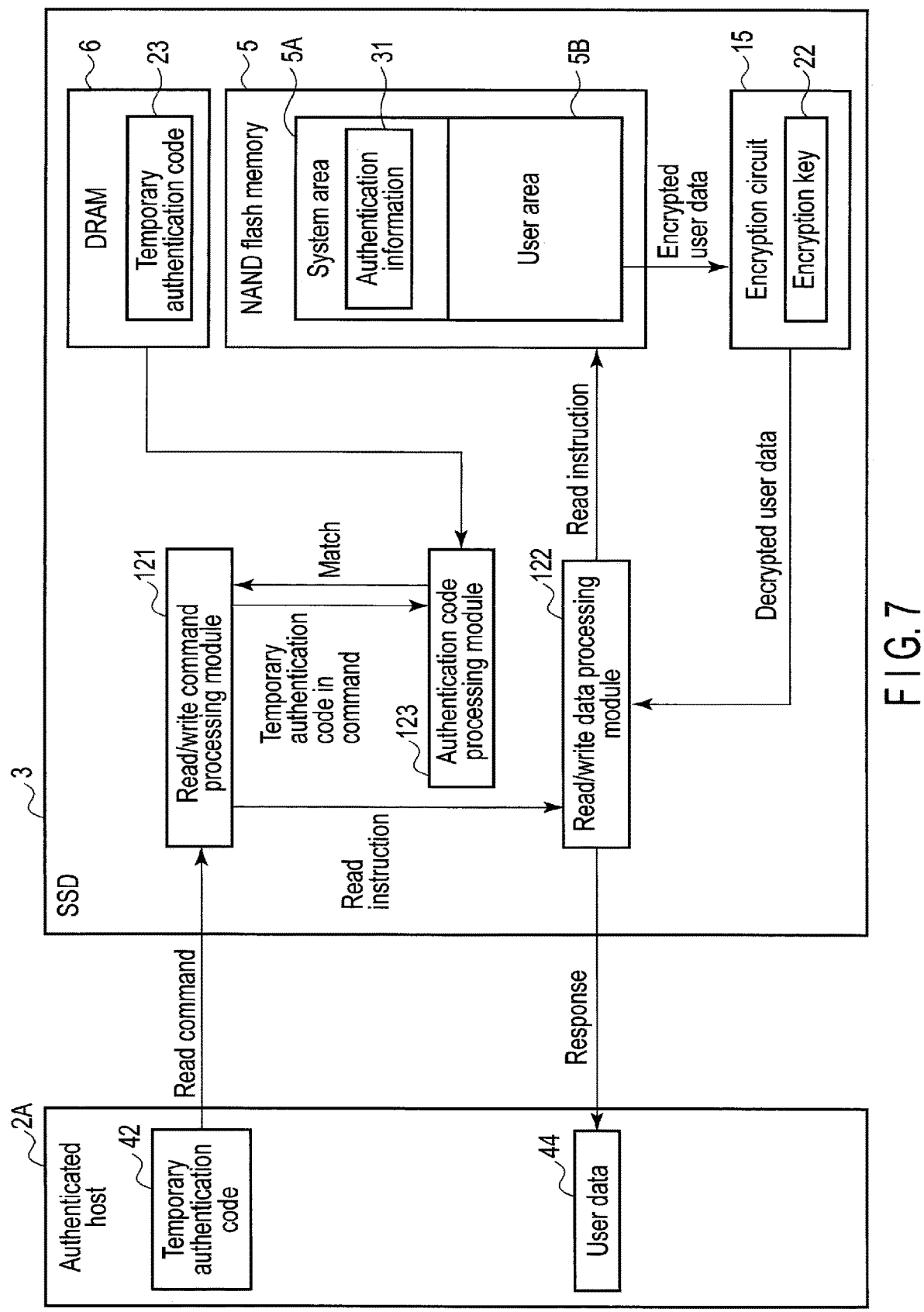
F I G. 7

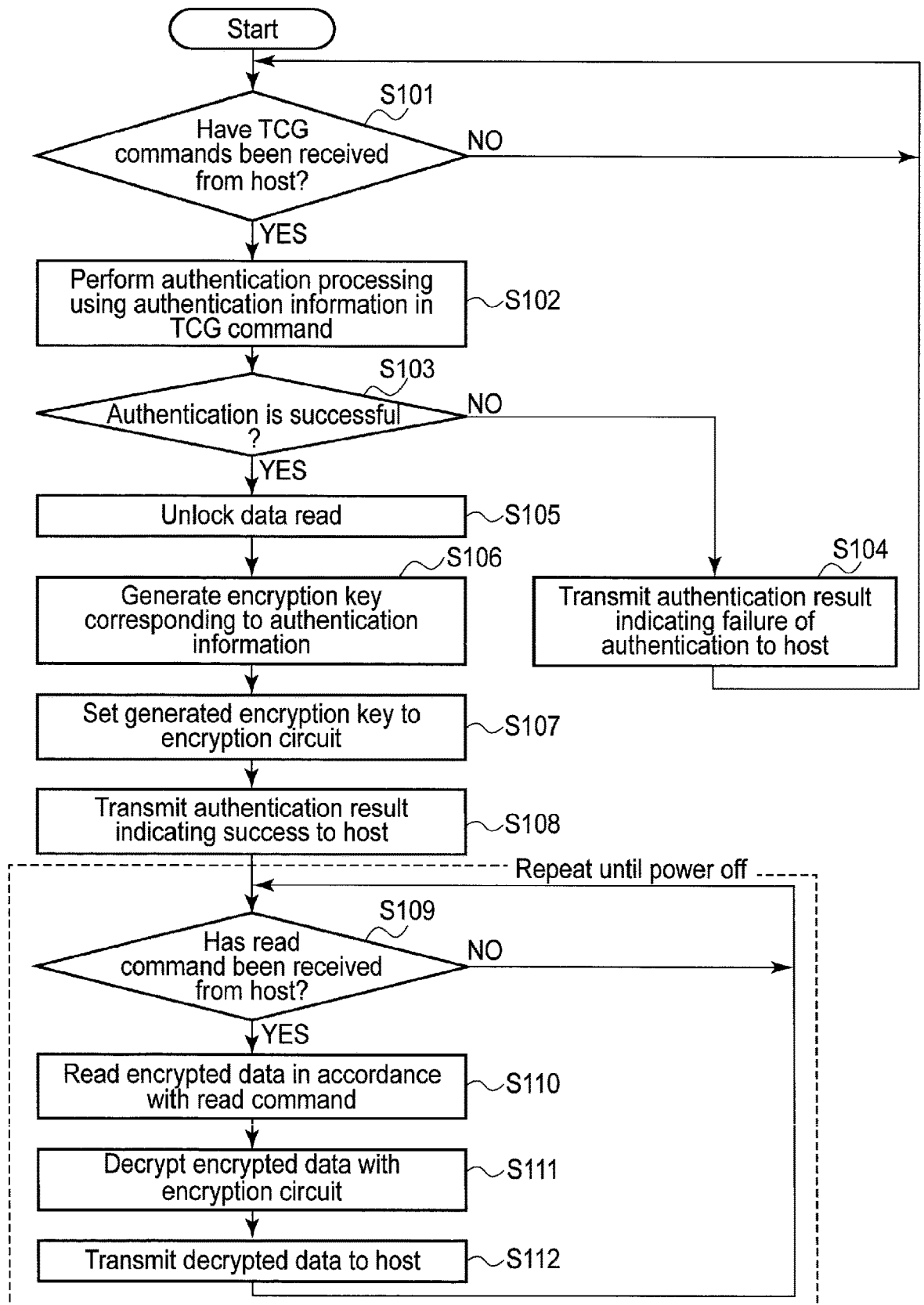
F I G. 11

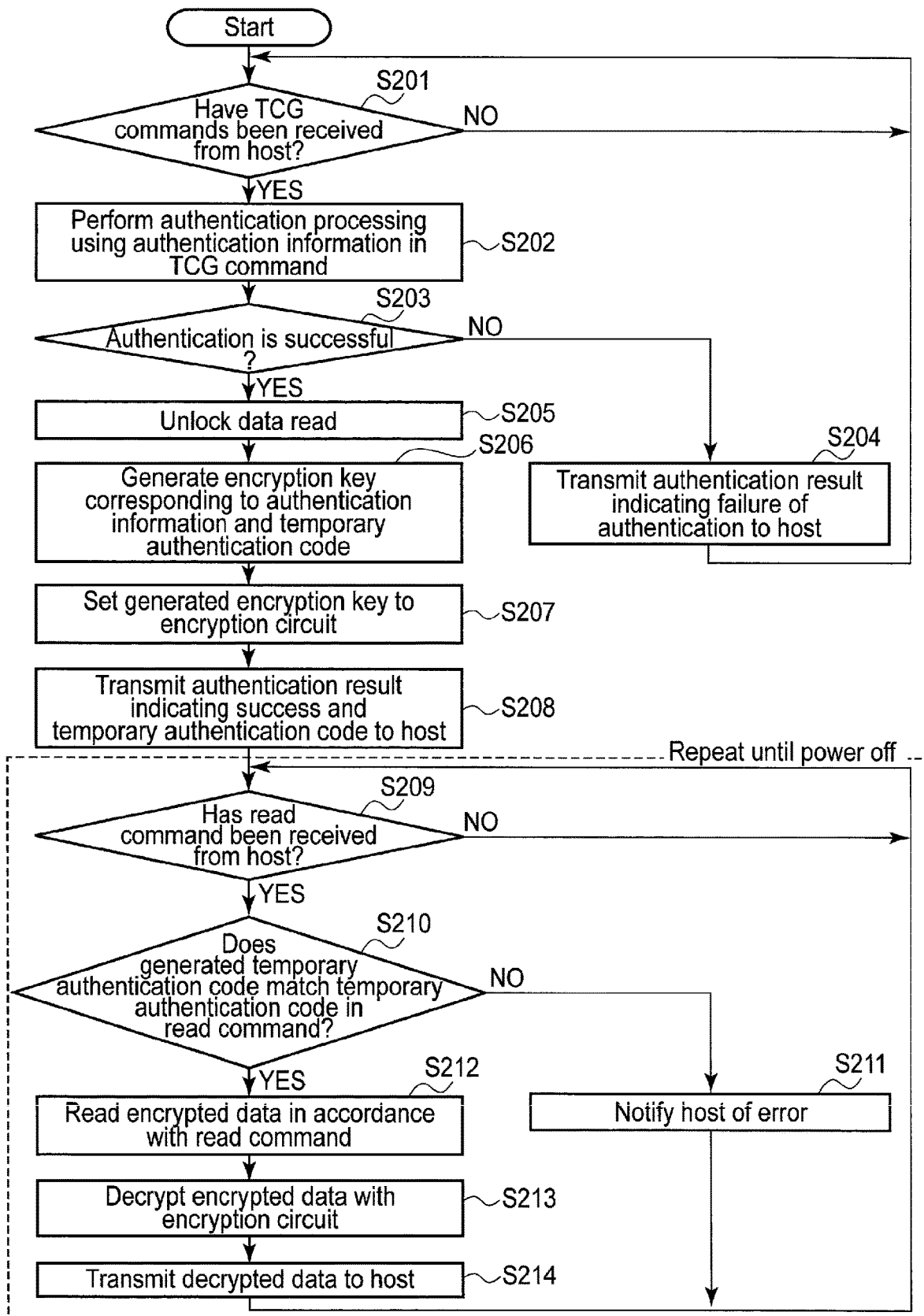
F I G. 12

MEMORY SYSTEM

CROSS-REFERENCE TO RELATED APPLICATIONS

This application is based upon and claims the benefit of priority from Japanese Patent Application No. 2019-010138, filed Jan. 24, 2019, the entire contents of which are incorporated herein by reference.

FIELD

Embodiments described herein relate generally to a memory system including a nonvolatile memory.

BACKGROUND

In recent years, memory systems including a nonvolatile memory are widely used.

As a type of the memory systems, a solid state drive (SSD) including a NAND flash memory is known. The SSD is used as the main storage of various computing devices.

In order to prevent data leakage and the like, a memory system may have a self-encrypting function of automatically encrypting data at the time of writing. The memory system having the self-encrypting function is also referred to as a self-encrypting drive (SED).

One of the security standards to which the SED should conform is Trusted Computing Group (TCG) standard. TCG standard defines, for example, data encryption and access control for each partial area in storage.

BRIEF DESCRIPTION OF THE DRAWINGS

FIG. 1 is a block diagram illustrating an example of the structure of a memory system according to an embodiment.

FIG. 2 is a block diagram illustrating the functional structure of the memory system of the embodiment.

FIG. 4 is a block diagram illustrating an example of an operation when authentication of a host by the memory system of the embodiment is unsuccessful.

FIG. 5 is a diagram illustrating an example of the configuration of an authentication request command received from a host by the memory system of the embodiment.

FIG. 6 is a diagram illustrating an example of the configuration of a response transmitted from the memory system of the embodiment to the host.

FIG. 7 is a block diagram illustrating an example of an operation in accordance with a read command from an authenticated host by the memory system of the embodiment.

FIG. 11 is a flowchart illustrating an example of the procedure of read control processing performed in a memory system according to a comparative example.

FIG. 12 is a flowchart illustrating an example of the procedure of read control processing performed in the memory system of the embodiment.

DETAILED DESCRIPTION

Figure 3:
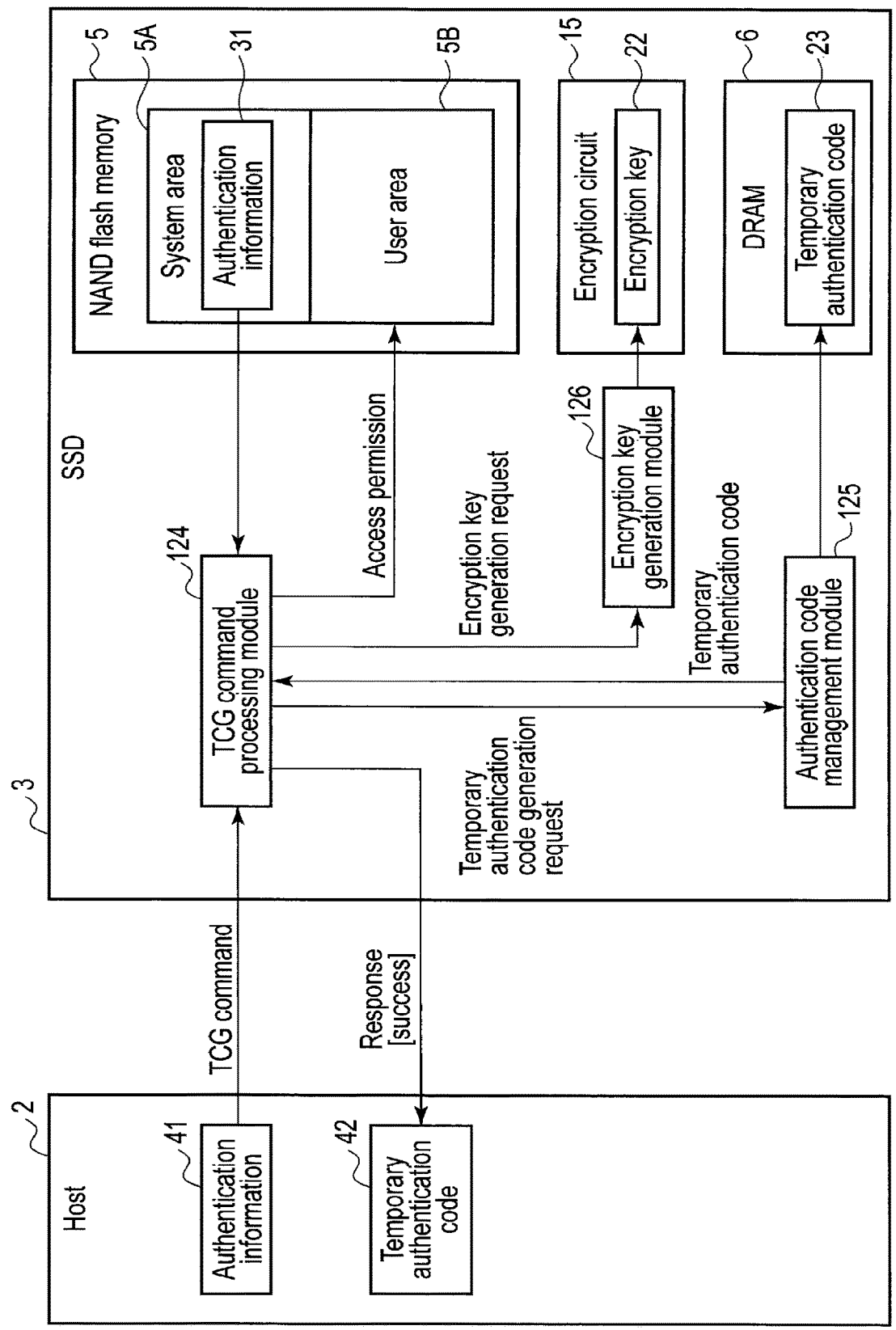
FIG. 3 is a block diagram illustrating an example of an operation when authentication of a host by the memory system of the embodiment is successful.

Various embodiments will be described hereinafter with reference to the accompanying drawings.

In general, according to one embodiment, a memory system is communicable with a plurality of hosts. The memory system includes a nonvolatile memory and a controller electrically connected to the nonvolatile memory. The controller encrypts data to be written into the nonvolatile memory and decrypts data read from the nonvolatile memory. The controller receives an authentication request command from a first host and transmits a first authentication code when authentication of the first host is successful. The controller receives an access command, which includes a second authentication code, for accessing the nonvolatile memory from a second host. The controller permits an access to the nonvolatile memory in accordance with the access command when the second authentication code matches the first authentication code, and prohibits an access to the nonvolatile memory in accordance with the access command when the second authentication code is different from the first authentication code.

With reference to FIG. 1, an information processing system 1 including a memory system of the present embodiment will be explained.

The memory system is a semiconductor storage device configured to write data into a nonvolatile memory such as a NAND flash memory 5 and read data from the nonvolatile memory, and is also referred to as a storage device. The memory system may be realized as a solid state drive (SSD) 3 that includes, for example, a NAND flash memory 5. Although a case where the memory system (that is, the storage device) is realized as the SSD 3 is described hereinafter, the memory system may be realized as a hard disk drive (HDD).

In order to prevent data leakage and the like, the SSD 3 has a self-encrypting function of automatically encrypting data at the time of writing. That is, the SSD 3 is a self-encrypting drive (SED) having a self-encrypting function. The SSD 3 conforms to, for example, Trusted Computing Group (TCG) standard, and has a self-encrypting function defined by TCG standard. TCG standard defines, for example, data encryption and access control for each partial area in storage.

The information processing system 1 includes one or more host devices 2-1, 2-2, . . . , 2-N (hereinafter also referred to as hosts), the SSD 3, and a switching device 7. Each of the hosts 2-1, 2-2, . . . , 2-N is an information processing apparatus that accesses the SSD 3 via the switching device 7. The switching device 7 is also referred to as an expander or a switch. Each of the hosts 2-1, 2-2, . . . , 2-N may be a storage server that stores a large amount of various data in the SSD 3, or may be a personal computer. Hereinafter, the one or more hosts 2-1, 2-2, . . . , 2-N or one host among them may be referred to as a host 2.

The SSD 3 may be used as a storage of the information processing apparatus functioning as the host 2. The SSD 3 may be contained in the information processing apparatus or may be connected to the information processing apparatus via a cable or a network.

As an interface for the connection between the host 2 and the SSD 3, SCSI, serial attached SCSI (SAS), ATA, serial ATA (SATA), PCI Express (PCIe) (registered trademark), Ethernet (registered trademark), Fibre channel, or NVM Express (NVMe) (registered trademark) may be used.

The SSD 3 includes a controller 4 and a NAND flash memory 5. The controller 4 may be realized with a circuit such as a system-on-a-chip (SoC).

The SSD 3 may include a random access memory (RAM) such as a dynamic random access memory (DRAM) 6 as a volatile memory. Alternatively, a RAM such as a static random access memory (SRAM) may be included in the controller 4. Note that the DRAM 6 may also be included in the controller 4.

The RAM such as the DRAM 6 includes a buffer area 20 for temporarily storing data to be written into the NAND flash memory 5 and data read from the NAND flash memory 5.

The RAM such as the DRAM 6 includes a cache area of a lookup table (LUT) 26 functioning as a logical-to-physical address conversion table. The LUT 26 manages mapping between each logical address (for example, a logical block address (LBA)) and each physical address of the NAND flash memory 5. Further, the RAM such as the DRAM 6 may include areas for storing various data (for example, an encryption key 22, and a temporary authentication code 23) that is used for processing commands received from the host 2.

The NAND flash memory 5 includes blocks B0 to B(m−1). Each of the blocks B0 to B(m−1) includes pages (here, pages P0 to P(n−1)). The blocks B0 to B(m−1) each function as a minimum erase unit. A block may be referred to as an erase block or a physical block. Each of the pages P0 to P(n−1) includes memory cells connected to a single word line. The pages P0 to P(n−1) each function as a unit of a data write operation and a data read operation. Note that a word line may be used as a unit of a data write operation and a data read operation.

The tolerable maximum number of program/erase cycles (maximum number of P/E cycles) for each of the blocks B0 to B(m−1) is limited. One P/E cycle of a block includes an erase operation to erase data stored in all memory cells in the block and a write operation (specifically, a program operation) to write data in each page of the block.

The controller 4 is electrically connected to the NAND flash memory 5 through a NAND interface 13 conforming to an interface standard such as a Toggle DDR or an open NAND flash interface (ONFI). The NAND interface 13 functions as a NAND control circuit configured to control the NAND flash memory 5.

The NAND interface 13 may be connected to NAND flash memory chips in the NAND flash memory 5 via multiple channels (Ch). By operating the NAND flash memory chips in parallel, it is possible to broaden an access bandwidth to the NAND flash memory 5.

The controller 4 functions as a memory controller configured to control the NAND flash memory 5.

The controller 4 may function as a flash translation layer (FTL) configured to execute data management and block management of the NAND flash memory 5. The data management executed by the FTL includes (1) management of mapping data indicative of relationship between each logical address and each physical address of the NAND flash memory 5, (2) process to hide read/write operations in units of page and erase operations in units of block, and the like. The logical address is an address used by the host 2 for addressing the SSD 3. As a logical address, for example, a logical block address (LBA) is used.

The management of mapping between each logical block address (LBA) and each physical address may be executed by using an LUT 21 functioning as a logical/physical address conversion table. The controller 4 manages mapping between each LBA and each physical address with a certain management size unit by using the LUT 21. A physical address corresponding to an LBA indicates a physical memory location in the NAND flash memory 5 to which data of the LBA is written. The LUT 21 may be loaded to the DRAM 6 from the NAND flash memory 5 when the SSD 3 is powered on.

Data write into one page is executable only once in a single P/E cycle. Thus, the controller 4 writes update data corresponding to an LBA not to an original physical memory location in which previous data corresponding to the LBA is stored but to a different physical memory location. Then, the controller 4 updates the LUT 21 to associate the LBA with the different physical memory location and to invalidate the previous data.

The block management includes, for example, management of defective blocks, wear leveling, and garbage collection.

The controller 4 may include a host interface 11, a CPU 12, the NAND interface 13, a DRAM interface 14, an encryption circuit 15, and the like. The host interface 11, the CPU 12, the NAND interface 13, the DRAM interface 14, and the encryption circuit 15 may be mutually connected through a bus 10.

The host interface 11 functions as a circuit that receives various commands such as I/O commands, various control commands, TCG commands conforming to TCG standard and the like from the host 2. The I/O commands may include a write command, a read command, and the like. The control commands may include an unmap command (trim command), a format command, a verify command, and the like. The format command is a command for unmapping all the logical addresses in the SSD 3 entirely. The verify command is a command for verifying integrity of stored information in the NAND flash memory 5 by reading data and metadata for an indicated LBA or LBA range from the NAND flash memory 5, without transferring any data or metadata to the host 2. The integrity of the stored information in the NAND flash memory 5 is verified based on, for example, whether error correction using the read data and metadata is successfully performed. The TCG command is a command for requesting the SSD 3 to perform authentication, change settings related to access control to the NAND flash memory 5, and the like.

The DRAM interface 14 functions as a DRAM controller configured to control accesses to the DRAM 6. The storage area of the DRAM 6 is allocated to an area for storing the LUT 21, the encryption key 22, the temporary authentication code 23, and the like, and a buffer area 20 used as a read/write buffer and the like.

The encryption circuit 15 performs encryption and decryption of user data. The encryption circuit 15 encrypts user data that is to be written into the NAND flash memory 5 via the NAND interface 13, and decrypts user data that has been read from the NAND flash memory 5 via the NAND interface 13, for example. The encryption circuit 15 performs encryption and decryption of user data with, for example, the encryption key 22 set by the CPU 12. The encryption key 22 may be stored in a RAM such as the DRAM 6.

The CPU 12 is a processor configured to control the host interface 11, the NAND interface 13, and the DRAM interface 14. The CPU 12 performs various processes by executing control programs stored in a ROM or the like (not shown). The control programs may be referred to as firmware. The CPU 12 may perform, in addition to the above-described processes of FTL, command processes to process various commands from the host 2. The operation of the CPU 12 is controlled by the above-described firmware executed by the CPU 12. Note that part of or the entire FTL processes and the command processes may be executed by a dedicated hardware in the controller 4.

The controller 4 further has functions for self-encryption, authentication of the host 2, and access control for the NAND flash memory 5.

By the way, for example, when one host 2 is connected to the SSD 3 conforming to TCG standard, the SSD 3 authenticates the host 2 by using authentication information such as a personal identification number (PIN) or a password transmitted from the host 2. When the authentication is successful, the host 2 can access the NAND flash memory 5, for example, to write data into the NAND flash memory 5 or to read data from the NAND flash memory 5. When the authentication is unsuccessful, the host 2 cannot write data into the NAND flash memory 5 or cannot read data from the NAND flash memory 5. That is, the SSD 3 controls such that the host 2, which does not have correct authentication information, cannot access the NAND flash memory 5.

However, for example, when multiple hosts 2 are connected to the SSD 3 conforming to TCG standard and authentication of a first host 2 of them is successful, not only the first host 2 but also a second host 2 of them whose authentication has not yet been successful may be able to access the NAND flash memory 5. Alternatively, when a first host 2 is connected to the SSD 3, the authentication of the first host 2 is successful, and a second host 2 is connected to the SSD 3, while the SSD 3 is kept in a power-on state, the second host 2 may also be able to access the NAND flash memory 5 even though the authentication has not yet been successful.

As described above, in the SSD 3 conforming to TCG standard, there is a possibility that the host 2 whose authentication has not yet been successful can access the NAND flash memory 5. The host 2 whose authentication has not yet been successful may be a host that does not have correct authentication information. The access by the host 2 whose authentication has not yet been successful may result in security defect such as leakage or alteration of data stored in the NAND flash memory 5.

Therefore, in the present embodiment, the SSD 3 conforming to the self-encryption standard such as TCG standard and various interface standards controls such that only the host 2 whose authentication is successful can access the NAND flash memory 5 and the host 2 whose authentication has not yet been successful cannot access the NAND flash memory 5.

More specifically, when authentication of a host 2 is successful, the SSD 3 generates a temporary authentication code and transmits the temporary authentication code only to the authenticated host 2. Then, the authenticated host 2 transmits an access command including the temporary authentication code to the SSD 3. The access command is a command for accessing the NAND flash memory 5 and is, for example, a read command, a write command, or the like.

When the generated temporary authentication code matches the temporary authentication code in the access command, the SSD 3 permits the access to the NAND flash memory 5 in accordance with the access command. On the other hand, when the generated temporary authentication code is different from the temporary authentication code in the access command, the SSD 3 prohibits the access to the NAND flash memory 5 in accordance with the access command. Since the SSD 3 controls such that only the host 2 that has acquired the temporary authentication code through the success of the authentication can access the NAND flash memory 5, the security for the access to the NAND flash memory 5 can be enhanced.

Note that the access to the NAND flash memory 5 may include an access to the buffer area 20 in which user data to be written into the NAND flash memory 5 is cached (that is, a write buffer), and an access to the buffer area 20 in which user data read from the NAND flash memory 5 is cached (that is, a read buffer). Therefore, regardless of whether the user data is stored in the NAND flash memory 5 or cached in the buffer area 20, the SSD 3 permits the access to data of the LBA or LBA range designated in the access command when the generated temporary authentication code matches the temporary authentication code in the access command and prohibits the access to data of the LBA or LBA range designated in the access command when the generated temporary authentication code is different from the temporary authentication code in the access command. That is, the SSD 3 controls not only the access to the NAND flash memory 5 itself but also the access to the buffer area 20 for temporarily storing data to be written into the NAND flash memory 5 and data read from the NAND flash memory 5.

In order to realize the above-described operations, the CPU 12 may function as, for example, a read/write command processing module 121, a read/write data processing module 122, an authentication code processing module 123, a TCG command processing module 124, an authentication code management module 125, and an encryption key generation module 126. With reference to FIG. 2, the operation of each of these modules will be explained.

The TCG command processing module 124, the authentication code management module 125 and the encryption key generation module 126 control authentication of a host 2. The TCG command processing module 124, the authentication code management module 125 and the encryption key generation module 126 receive an authentication request command that requests authentication from a host 2, and transmits the temporary authentication code 23 to the host 2 when the authentication of the host 2 using the authentication information in the authentication request command is successful. The temporary authentication code 23 is stored in, for example, the DRAM 6.

The read/write command processing module 121, the read/write data processing module 122 and the authentication code processing module 123 control access to the NAND flash memory 5 by a host 2. The read/write command processing module 121, the read/write data processing module 122 and the authentication code processing module 123 receive an access command for accessing the NAND flash memory 5 transmitted from a host 2. When the temporary authentication code in the access command matches the temporary authentication code 23 stored in the DRAM 6 or the like, the read/write command processing module 121, the read/write data processing module 122 and the authentication code processing module 123 permit the access to the NAND flash memory 5 in accordance with the access command. On the other hand, when the temporary authentication code in the access command is different from the temporary authentication code 23 stored in the DRAM 6 or the like, the read/write command processing module 121, the read/write data processing module 122, and the authentication code processing module 123 prohibit the access to the NAND flash memory 5 in accordance with the access command.

More specifically, the TCG command processing module 124 processes TCG commands received from a host 2 via the host interface 11. As described above, each TCG command is a command conforming to TCG standard and is used, for example, for the host 2 to request the SSD 3 to change settings related to authentication or security. The TCG command processing module 124 performs authentication processing in accordance with a TCG command that requests authentication (that is, an authentication request command). The TCG command processing module 124 performs setting change processing in accordance with a TCG command that requests a setting change (hereinafter referred to as a setting change command).

The authentication request command includes authentication information of the host 2 such as a PIN or a password. The authentication request command may be encrypted by using, for example, TCG Secure Messaging technology so that the authentication information is not transmitted in plaintext. In that case, the TCG command processing module 124 decrypts the encrypted authentication information in the authentication request command by using the technology.

The setting change command includes an identifier of an attribute of the setting to be changed and a value to be newly set to the attribute. For example, when any of read enable/disable, write enable/disable, and read enable/disable and write enable/disable for the NAND flash memory 5 is set as the attribute of the setting to be changed, the value to be newly set to the attribute is set as "enable" or "disable". Therefore, for example, when the host 2 makes a request to enable reading from the NAND flash memory 5, the setting change command includes an attribute identifier indicating "read enable/disable" and a value indicating "enable".

The TCG command processing module 124 verifies whether the host 2 has correct authentication information using the authentication information (or the decrypted authentication information) in the authentication request command and the authentication information 31 stored in the NAND flash memory 5. When the authentication information in the authentication request command matches the authentication information 31 stored in the NAND flash memory 5, the TCG command processing module 124 determines that the authentication of the host 2 is successful since the host 2 has the correct authentication information. When the authentication information in the authentication request command is different from the authentication information 31 stored in the NAND flash memory 5, the TCG command processing module 124 determines that the authentication of the host 2 is unsuccessful since the host 2 does not have the correct authentication information. Note that the authentication information 31 stored in the NAND flash memory 5 may be the correct authentication information itself, or may be information from which the correct authentication information can be derived by performing specific processing.

When the authentication of the host 2 is successful, the TCG command processing module 124 sets the NAND flash memory 5 to be accessible. The TCG command processing module 124 may enable at least one of read access and write access to the NAND flash memory 5, based on the identifier of the attribute of the setting to be changed and the value to be newly set to the attribute that are included in the setting change command.

When the authentication of the host 2 is successful, the encryption key generation module 126 generates an encryption key 22 and sets the encryption key 22 to the encryption circuit 15. The encryption key 22 is used for encryption of user data and decryption of encrypted user data.

When the authentication of the host 2 is successful, the authentication code management module 125 generates a temporary authentication code 23 and stores the temporary authentication code 23 in a RAM such as the DRAM 6 or the like. Any information may be used for the temporary authentication code 23. For example, a random number may be used for the temporary authentication code 23. Alternatively, the authentication code management module 125 may generate, as the temporary authentication code 23, information in which the random number and the identifier of the host 2 are combined. The identifier of the host 2 may be acquired, for example, at the time of connection of the interface layer between the host 2 and the SSD 3 (for example, at the time of a link-up).

Then, the TCG command processing module 124 transmits a response via the host interface 11, which includes information indicating the success of the authentication and the temporary authentication code 23, to the host 2 that has transmitted the authentication request command. As with the authentication request command, the response may also be encrypted and transmitted by using TCG Secure Messaging technology. That is, the TCG command processing module 124 may transmit the encrypted temporary authentication code 23 to the host 2.

In contrast, when the authentication of the host 2 is unsuccessful, the TCG command processing module 124 transmits a response, which includes information indicating the failure of the authentication, to the host 2 via the host interface 11. In this case, the temporary authentication code 23 is not generated and is not transmitted to the host 2.

The read/write command processing module 121 processes an access command for access to the NAND flash memory 5, which is received from the host 2. The access command is, for example, a read command and a write command, but may be another command, such as an unmap command, a format command, a verify command, or the like, which may cause access to the NAND flash memory 5.

The read/write command processing module 121 and the authentication code processing module 123 determine whether the temporary authentication code in the access command matches the temporary authentication code 23 generated by the authentication code management module 125 (that is, the temporary authentication code 23 stored in the DRAM 6). The temporary authentication code in the access command may be encrypted with a session key by the host 2. In this case, the read/write command processing module 121 and the authentication code processing module 123 decrypt the encrypted temporary authentication code in the access command with the session key, and the authentication code processing module 123 determines whether the decrypted temporary authentication code matches the temporary authentication code 23 generated by the authentication code management module 125. The session key is an encryption key exchanged between the host 2 and the SSD 3.

When the temporary authentication code in the access command (or the temporary authentication code obtained by decrypting the encrypted temporary authentication code in the access command) matches the temporary authentication code 23 generated by the authentication code management module 125, the read/write data processing module 122 operates to permit the access to the NAND flash memory 5 in accordance with the access command.

When the access command is a read command, the read/write data processing module 122 and the encryption circuit 15 read user data from the NAND flash memory 5 in accordance with the read command, decrypt the user data, and transmit the decrypted user data to the host 2.

More specifically, the read/write data processing module 122 determines a physical address corresponding to an LBA designated by the read command based on an entry of the LUT 21 corresponding to the LBA. The read/write data processing module 122 requests the NAND flash memory 5 to read user data written in the physical address via the NAND interface 13.

The user data read from the NAND flash memory 5 in accordance with the request is transmitted to the encryption circuit 15 via the NAND interface 13. The encryption circuit 15 decrypts the user data with the encryption key 22 and transmits the decrypted user data to the read/write data processing module 122. Therefore, the read/write data processing module 122 can transmit the user data in accordance with the read command to the host 2 via the host interface 11.

When the access command is a write command, the read/write data processing module 122 and the encryption circuit 15 receive user data transmitted from the host 2 in accordance with acceptance of the write command, encrypt the user data, and write the encrypted user data into the NAND flash memory 5.

More specifically, the read/write data processing module 122 receives the user data transmitted from the host 2 in accordance with the acceptance of the write command via the host interface 11. The read/write data processing module 122 sends the received user data to the encryption circuit 15. The encryption circuit 15 encrypts the user data with the encryption key 22 and transfers the encrypted user data to the NAND flash memory 5 via the NAND interface 13.

When the write command specifies an LBA to which the user data is to be written, the read/write data processing module 122 determines a physical address to which the user data is to be written. The read/write data processing module 122 requests the NAND flash memory 5 to write the user data in a block and a page corresponding to the determined physical address. Therefore, information indicating the physical address (for example, a block and a page) and the encrypted user data are transferred to the NAND flash memory 5.

Next, the read/write data processing module 122 instructs the NAND flash memory 5 to program. That is, the read/write data processing module 122 transmits a program command to the NAND flash memory 5 so as to cause the NAND flash memory 5 to program the encrypted user data into the page in the block as the write destination. The read/write data processing module 122 maps the LBA and the physical address. This mapping is recorded as an entry in the LUT 21.

Thus, when the access command includes the temporary authentication code 23 transmitted to the host 2 because of the success of the authentication, the SSD 3 performs processing in accordance with the access command. That is, access to the NAND flash memory 5 from the authenticated host 2 can be permitted.

In contrast, when the temporary authentication code in the access command is different from the temporary authentication code 23 generated by the authentication code management module 125, the read/write command processing module 121 transmits a response including an error to the host 2. When the access command is a read command, for example, the read/write data processing module 122 does not read user data from the NAND flash memory 5. When the access command is a write command, for example, the read/write data processing module 122 does not write user data into the NAND flash memory 5. Thus, when the access command does not include the temporary authentication code 23 transmitted to the host 2 because of the success of the authentication, the SSD 3 does not perform processing in accordance with the access command. That is, the access to the NAND flash memory 5 from the unauthenticated host 2 can be prohibited.

With reference to FIGS. 3 and 4, the operations for authentication and access control by the TCG command processing module 124, the authentication code management module 125 and the encryption key generation module 126 will be explained more specifically. FIGS. 3 and 4 illustrate only the elements associated with this operation in order to make the explanation easier to understand.

FIG. 3 illustrates an example of an operation when authentication of a host 2 is successful.

First, the host 2 transmits TCG commands to the SSD 3. The TCG commands are an authentication request command including authentication information 41 and a setting change command. The host 2 is a host that has correct authentication information. That is, the authentication information 41 possessed by the host 2 is the correct authentication information.

The TCG command processing module 124 receives the authentication request command and the setting change command from the host 2. The TCG command processing module 124 determines whether the authentication information 41 in the authentication request command matches the authentication information 31 stored in the NAND flash memory 5. The NAND flash memory 5 contains, for example, a system area 5A in which the authentication information 31 and the like are to be stored, and a user area 5B in which user data is to be stored. The user area 5B is an area where the access from the host 2 is controlled by using the authentication information 31.

When the authentication information 41 in the authentication request command matches the authentication information 31 stored in the NAND flash memory 5, that is, when the authentication of the host 2 is successful, the TCG command processing module 124 permits the access to the user area 5B based on the setting change command, requests the encryption key generation module 126 to generate an encryption key, and requests the authentication code management module 125 to generate a temporary authentication code. The TCG command processing module 124 permits, for example, at least one of read and write to the user area 5B based on information designated by the setting change command. In other words, the TCG command processing module 124 releases at least one of lock of read on the user area 5B and lock of write on the user area 5B based on the information designated by the setting change command.

The encryption key generation module 126 generates an encryption key 22 and sets the generated encryption key 22 to the encryption circuit 15. The authentication code management module 125 generates a temporary authentication code 23 and stores the generated temporary authentication code 23 in a RAM such as the DRAM 6 or the like.

The TCG command processing module 124 transmits, to the host 2, a response including information indicating the success of the authentication and the generated temporary authentication code 23. The host 2 acquires the temporary authentication code 23 in the response. Hereinafter, in order to make the explanation easier to understand, the temporary authentication code 23 stored in the host 2 whose authentication is successful will be referred to as a temporary authentication code 42.

Note that when the temporary authentication code 23 is generated according to the success of the authentication of a first host 2 and then the authentication of a second host 2 is successful, the TCG command processing module 124 may transmit the already generated temporary authentication code 23 to the second host 2. Alternatively, another temporary authentication code 23 may be newly generated and transmitted to the second host 2. In this case, the temporary authentication code 23 and the identifier of the host 2 associated with the temporary authentication code 23 are stored in the RAM such as the DRAM 6 or the like.

As described above, when the authentication of the host 2 is successful, the access to the user area 5B is permitted, the encryption key 22 is set to the encryption circuit 15, and the temporary authentication code 23 is generated. The host 2 whose authentication is successful can acquire the temporary authentication code 23.

FIG. 4 illustrates an example of an operation when authentication of a host 2 is unsuccessful.

First, the host 2 transmits TCG commands to the SSD 3. The TCG commands are an authentication request command including authentication information 43 and a setting change command. The host 2 is a host that does not have correct authentication information. That is, the authentication information 43 possessed by the host 2 is incorrect authentication information.

The TCG command processing module 124 receives the authentication request command and the setting change command from the host 2. The TCG command processing module 124 determines whether the authentication information 43 in the authentication request command matches the authentication information 31 stored in the NAND flash memory 5.

When the authentication information 43 in the authentication request command is different from the authentication information 31 stored in the NAND flash memory 5, that is, when the authentication of the host 2 is unsuccessful, the TCG command processing module 124 transmits a response that includes information indicating the failure of the authentication to the host 2. In response to the setting change command, the TCG command processing module 124 transmits, to the host 2, a response that includes information indicating that the setting change is impossible due to the failure of the authentication. That is, the TCG command processing module 124 does not permit the access (for example, read and write) to the user area 5B. In other words, the TCG command processing module 124 does not release the lock of the access to the user area 5B. Neither the generation of the encryption key 22 by the encryption key generation module 126 nor the generation of the temporary authentication code 23 by the authentication code management module 125 is performed. Therefore, the host 2 whose authentication is unsuccessful cannot acquire the temporary authentication code 23.

FIG. 5 illustrates an example of the configuration of an authentication request command transmitted from the host 2. A TCG command including the authentication request command contains, for example, an 8-byte Method UID, an 8-byte Authority, and a 32-byte PIN.

"Method UID" indicates the content of processing requested by this command. The TCG command in which a value "00 00 00 06 00 00 00 0C" for requesting "Authenticate" is set in "Method UID" is treated as the authentication request command.

"Authority" indicates an authority to which the TCG command is applied. When the TCG command is the authentication request command, "Authority" indicates an authority to be authenticated using authentication information such as a PIN or a password included in the command. The value "00 00 00 09 00 00 80 01" corresponding to the authority of BandMaster0 is illustrated as an example.

"PIN" indicates authentication information that the host 2 transmitting the TCG command has. For example, when the value "61 61 61 . . . 61" set to "PIN" in the command matches the authentication information 31 that corresponds to the authority of BandMaster0 and is stored in the SSD 3, the SSD 3 determines that the authentication of the host 2 is successful for the authority of the BandMaster0.

FIG. 6 illustrates an example of the configuration of a response transmitted from the SSD 3. The response includes, for example, a 1-byte authentication result, a 32-byte temporary authentication code, and a 3-byte Method Status.

The "Authentication result" indicates success or failure that is an authentication result of the host 2. When the authentication of the host 2 is successful, the "authentication result" describes a value indicating success. When the authentication of the host 2 is unsuccessful, the "authentication result" describes a value indicating failure.

When the authentication of the host 2 is successful, the "temporary authentication code" indicates a temporary authentication code for the access to the NAND flash memory 5. When the authentication of the host 2 is unsuccessful, for example, no value is described in the "temporary authentication code".

"Method Status" indicates an error status related to a TCG command corresponding to this response. For example, when parameters in the TCG command are valid and the authentication of the host 2 has been performed, a value indicating success is described in "Method Status". When the parameters in the TCG command are invalid and the authentication of the host 2 has not been performed, a value indicating failure is described in "Method Status".

Figure 8:
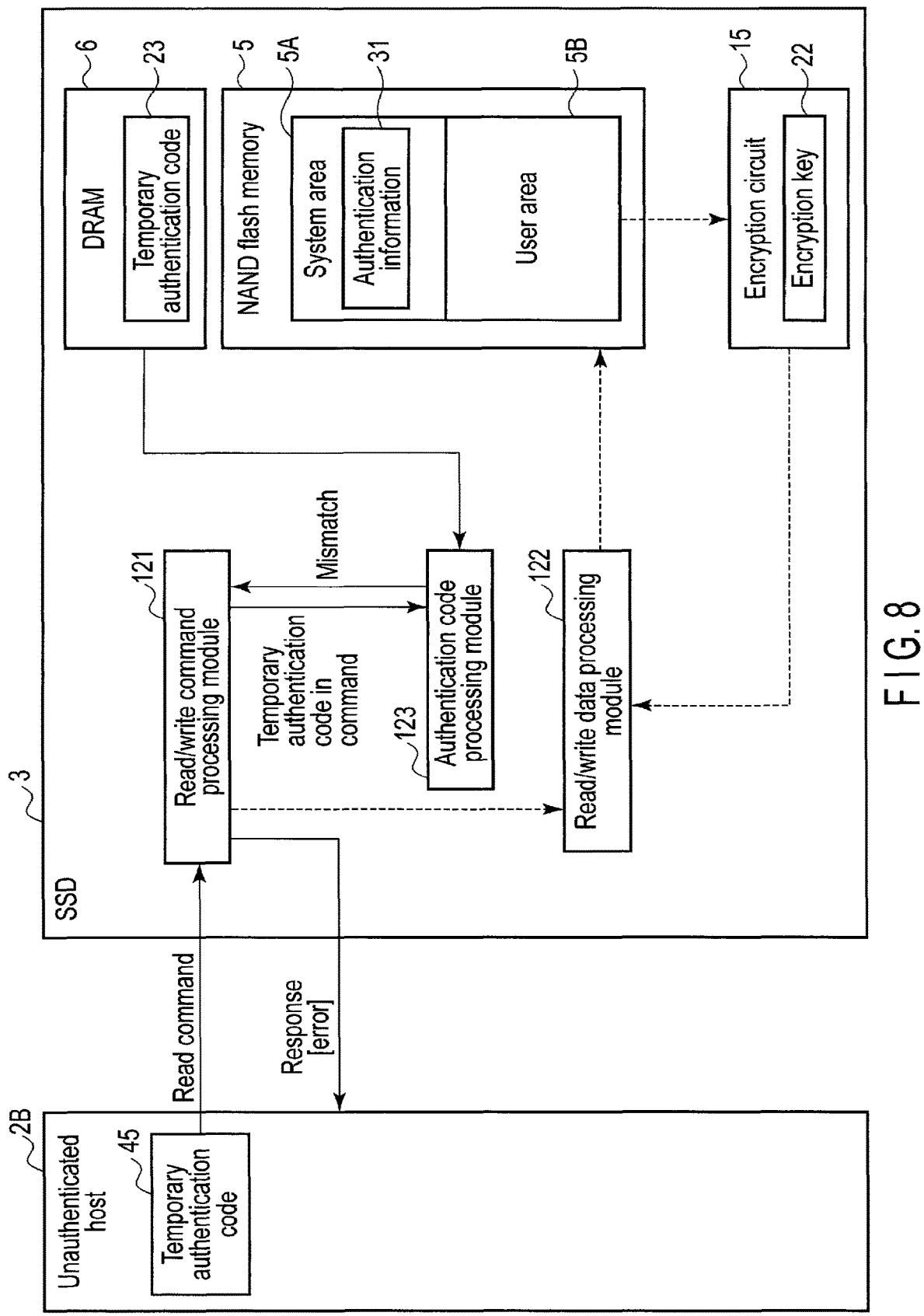
FIG. 8 is a block diagram illustrating an example of an operation in accordance with a read command from an unauthenticated host by the memory system of the embodiment.

With reference to FIGS. 7 and 8, an example of an operation when a read command is transmitted from the host 2 to the SSD 3 will be explained. FIGS. 7 and 8 illustrate only the elements associated with this operation in order to make the explanation easier to understand.

In the example illustrated in FIG. 7, a read command is transmitted to the SSD 3 from an authenticated host 2A among the hosts 2. The authenticated host 2A is a host 2 that has been successfully authenticated by the SSD 3 and has received the temporary authentication code 42 through the operation described above with reference to FIG. 3.

The authenticated host 2A transmits, to the SSD 3, a read command including the temporary authentication code 42 that is received from the SSD 3 in response to the success of the authentication of the host 2A. The read command includes, for example, an LBA or an LBA range of user data to be read.

The read/write command processing module 121 receives the read command. The read/write command processing module 121 sends the temporary authentication code 42 in the read command to the authentication code processing module 123.

The authentication code processing module 123 compares the temporary authentication code 42 in the read command with the temporary authentication code 23 stored in the DRAM 6 to determine whether the temporary authentication codes 42 and 23 match each other. Since the two temporary authentication codes 42 and 23 match each other, the authentication code processing module 123 notifies the read/write command processing module 121 that the two temporary authentication codes 42 and 23 match each other.

In response to this notification, the read/write command processing module 121 instructs the read/write data processing module 122 to read user data in accordance with the read command. The read/write data processing module 122 determines a physical address corresponding to the LBA or the LBA range designated by the read command using the LUT 21, and instructs the NAND flash memory 5 to read the user data from the physical address via the NAND interface 13. The user data read from the NAND flash memory 5 in accordance with this instruction is encrypted user data and thus is transferred to the encryption circuit 15.

The encryption circuit 15 decrypts the encrypted user data using the encryption key 22 set when the authentication of the authenticated host 2A was successful. The encryption circuit 15 sends the decrypted user data to the read/write data processing module 122.

The read/write data processing module 122 transmits a response including the decrypted user data to the authenticated host 2A. Therefore, the authenticated host 2A having the correct temporary authentication code 42 can read the user data from the NAND flash memory 5 by using the read command.

In contrast, in the example illustrated in FIG. 8, a read command is transmitted to the SSD 3 from an unauthenticated host 2B among the hosts 2. The unauthenticated host 2B is a host 2 whose authentication by the SSD 3 has been unsuccessful through the operation described above with reference to FIG. 4 or a host 2 that has not yet transmitted an authentication request command to the SSD 3.

First, the unauthenticated host 2B transmits a read command including a temporary authentication code 45 to the SSD 3. The temporary authentication code 45 is not a temporary authentication code generated when the authentication of the host 2 by the SSD 3 is successful, but an incorrect temporary authentication code. Alternatively, instead of including the invalid temporary authentication code, the field that should include the temporary authentication code in the read command may be empty. The read command includes, for example, an LBA or an LBA range of user data to be read.

The read/write command processing module 121 receives the read command. The read/write command processing module 121 sends the temporary authentication code 45 in the read command to the authentication code processing module 123.

The authentication code processing module 123 compares the temporary authentication code 45 in the read command with the temporary authentication code 23 stored in the DRAM 6 to determine whether the two temporary authentication codes 45 and 23 match each other. Here, because the two temporary authentication codes 45 and 23 do not match each other, the authentication code processing module 123 notifies the read/write command processing module 121 that the two temporary authentication codes 45 and 23 do not match each other.

In response to this notification, the read/write command processing module 121 transmits a response indicating an error to the unauthenticated host 2B. Therefore, the unauthenticated host 2B that does not have the correct temporary authentication code 42 cannot read the user data in accordance with the read command from the NAND flash memory 5.

Figure 9:
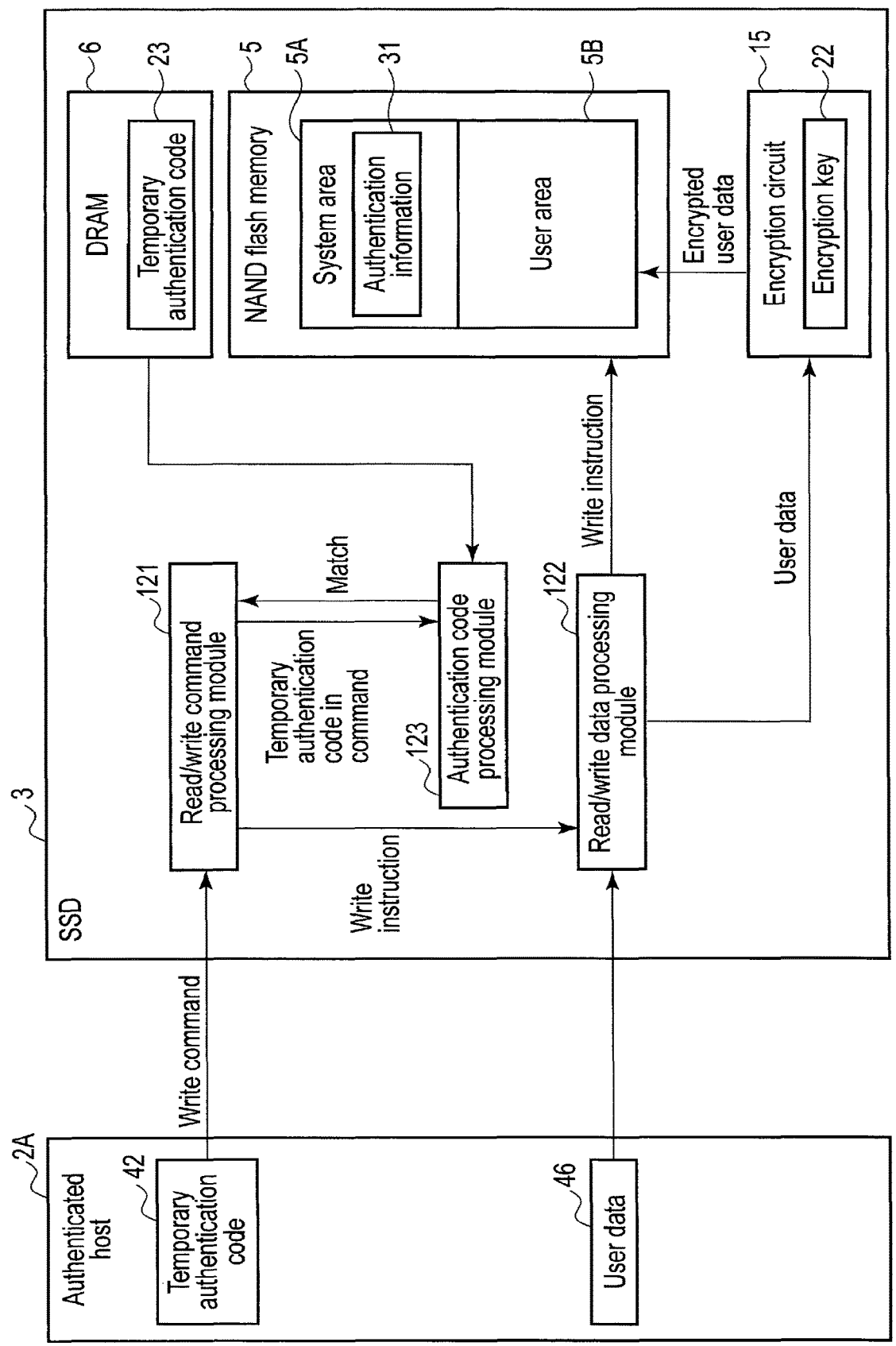
FIG. 9 is a block diagram illustrating an example of an operation in accordance with a write command from an authenticated host by the memory system of the embodiment.
Figure 10:
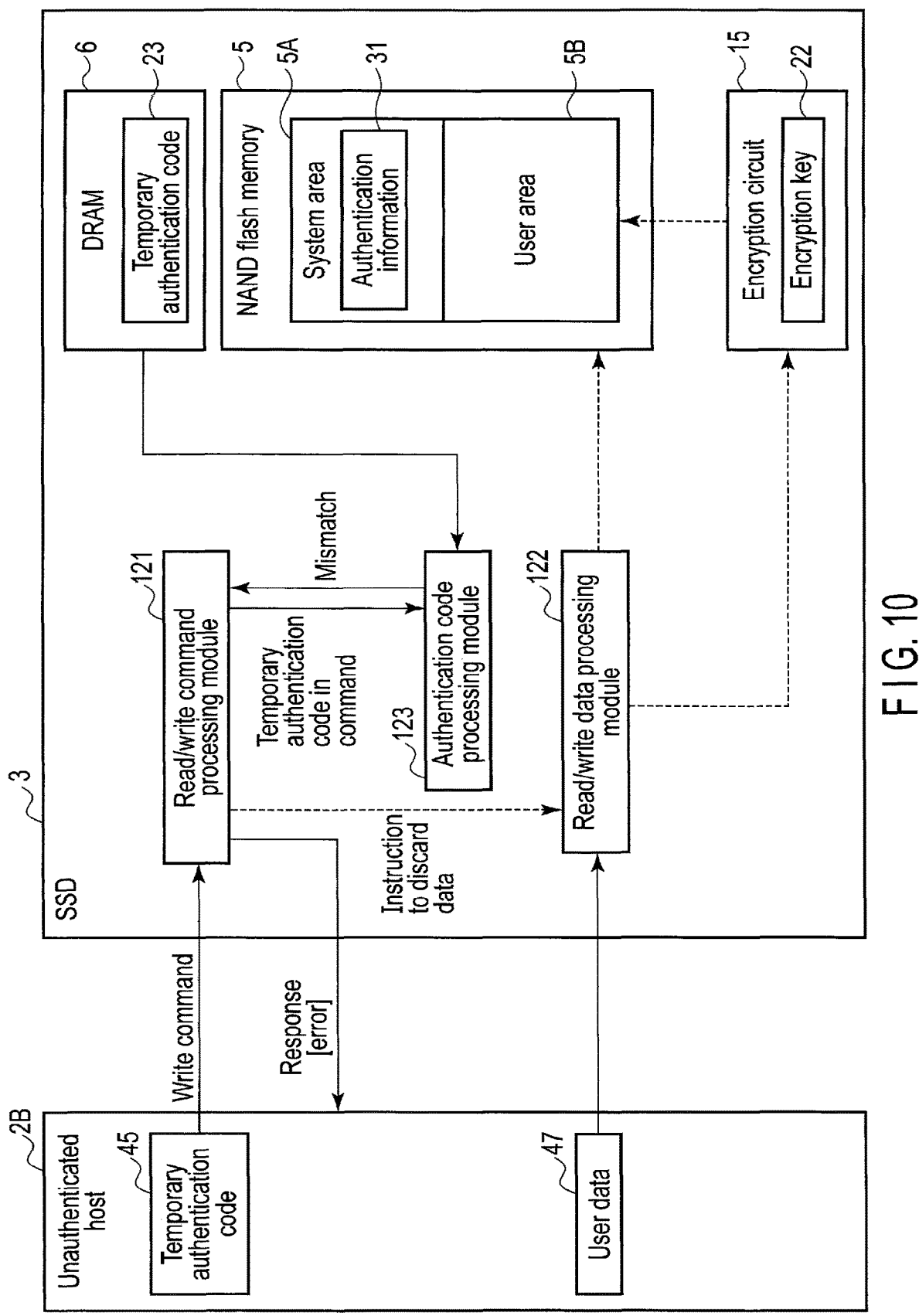
FIG. 10 is a block diagram illustrating an example of an operation in accordance with a write command from an unauthenticated host by the memory system of the embodiment.

With reference to FIGS. 9 and 10, an example of an operation when a write command is transmitted from the host 2 to the SSD 3 will be explained. FIGS. 9 and 10 illustrate only the elements associated with this operation in order to make the explanation easier to understand.

In the example illustrated in FIG. 9, a write command is transmitted to the SSD 3 from the authenticated host 2A among the hosts 2. As described above, the authenticated host 2A is a host 2 that has been successfully authenticated by the SSD 3 and has received the temporary authentication code 42 through the operation described above with reference to FIG. 3.

The authenticated host 2A transmits, to the SSD 3, a write command including the temporary authentication code 42 that is received from the SSD 3 in response to the success of the authentication of the host 2A. The authenticated host 2A transmits, to the SSD 3, user data 46 to be written in accordance with the write command. The write command includes, for example, an LBA or an LBA range in which the user data 46 is to be written.

The read/write command processing module 121 receives the write command. The read/write command processing module 121 sends the temporary authentication code 42 in the write command to the authentication code processing module 123.

The authentication code processing module 123 compares the temporary authentication code 42 in the write command with the temporary authentication code 23 stored in the DRAM 6 to determine whether the two temporary authentication codes 42 and 23 match each other. Here, because the two temporary authentication codes 42 and 23 match each other, the authentication code processing module 123 notifies the read/write command processing module 121 that the two temporary authentication codes 42 and 23 match each other.

In response to this notification, the read/write command processing module 121 instructs the read/write data processing module 122 to write the user data 46 in accordance with the write command.

The read/write data processing module 122 sends the user data 46, which is received from the authenticated host 2A in accordance with the write command, to the encryption circuit 15. The encryption circuit 15 encrypts the user data 46 using the encryption key 22 set when the authentication of the authenticated host 2A was successful. The encryption circuit 15 transfers the encrypted user data 46 to the NAND flash memory 5 via the NAND interface 13.

The read/write data processing module 122 instructs the NAND flash memory 5 to write (more specifically, program) the transferred user data 46. Thus, the encrypted user data 46 is written into the user area 5B in the NAND flash memory 5. Then, the read/write data processing module 122 updates the LUT 21 with an entry where the physical address in which the user data 46 is written and the LBA are mapped.

As described above, the authenticated host 2A having the correct temporary authentication code 42 can write the user data 46 into the NAND flash memory 5 by using the write command.

In contrast, in the example illustrated in FIG. 10, a write command is transmitted to the SSD 3 from the unauthenticated host 2B among the hosts 2. As described above, the unauthenticated host 2B is, for example, a host 2 whose authentication by the SSD 3 has been unsuccessful through the operation described above with reference to FIG. 4 or a host 2 that has not yet transmitted an authentication request command to the SSD 3.

First, the unauthenticated host 2B transmits a write command including a temporary authentication code 45 to the SSD 3. The temporary authentication code 45 is not a temporary authentication code generated when the authentication of the host 2 by the SSD 3 is successful, but an incorrect temporary authentication code. Alternatively, instead of including the invalid temporary authentication code, the field that should include the temporary authentication code in the write command may be empty. The unauthenticated host 2B transmits, to the SSD 3, user data 47 to be written in accordance with the write command. The write command includes, for example, an LBA or an LBA range in which the user data 47 is to be written.

The read/write command processing module 121 receives the write command. The read/write command processing module 121 sends the temporary authentication code 45 in the write command to the authentication code processing module 123.

The authentication code processing module 123 compares the temporary authentication code 45 in the write command with the temporary authentication code 23 stored in the DRAM 6 to determine whether the two temporary authentication codes 45 and 23 match each other. Here, because the two temporary authentication codes 45 and 23 do not match each other, the authentication code processing module 123 notifies the read/write command processing module 121 that the two temporary authentication codes 45 and 23 do not match each other.

In response to this notification, the read/write command processing module 121 transmits a response indicating an error to the unauthenticated host 2B. In response to this notification, the read/write command processing module 121 instructs the read/write data processing module 122 to discard the user data 47 received from the unauthenticated host 2B. The read/write data processing module 122 discards the user data 47 in accordance with this instruction. Thus, the user data 47 is not written into the NAND flash memory 5.

As described above, the unauthenticated host 2B that does not have the correct temporary authentication code 42 cannot write the user data 47 into the NAND flash memory 5 by using the write command.

Note that the case where the read command and the write command are transmitted from the host 2 to the SSD 3 has been described, but the access command transmitted from the host 2 to the SSD 3 may be an unmap command, a format command, a verify command, or the like. The authenticated host 2A transmits to the SSD 3 the temporary authentication code 42 in any access commands. The SSD 3 performs processing in accordance with the access command that includes the correct temporary authentication code 42 (that is, the temporary authentication code that matches the temporary authentication code 23 stored in the DRAM 6), and returns an error in accordance with the access command that does not include the correct temporary authentication code 42. Therefore, the SSD 3 can operate so as to perform processing in accordance with an access command transmitted from the authenticated host 2A only and not to perform processing in accordance with an access command transmitted from the unauthenticated host 2B.

Read control processing performed by a controller in a memory system according to a comparative example that does not use a temporary authentication code will be explained with reference to a flowchart of FIG. 11, and read control processing performed by the controller 4 of the present embodiment that uses a temporary authentication code will be explained with reference to a flowchart of FIG. 12.

FIG. 11 illustrates an example of the procedure of the read control processing by the controller that does not use the temporary authentication code. The controller is configured to process access commands from all connected hosts after the authentication of one of the hosts has been successful. A case where an authentication request command and a setting change command requesting to enable data read are transmitted from one of the hosts 2 connected to an SSD that includes the controller will be exemplified.

First, the controller determines whether TCG commands including an authentication request command and a setting change command have been received from any of the hosts 2 (step S101). When the TCG commands have not been received from any of the hosts 2 (NO in step S101), the processing returns to step S101 to determine again whether the TCG commands have been received.

In contrast, when the TCG commands have been received from a host 2 (hereinafter referred to as a first host) (YES in step S101), the controller performs authentication processing of the first host 2 by using authentication information of the first host 2 included in the authentication request command (step S102). The controller determines whether the authentication of the first host 2 is successful in the authentication processing (step S103). When the authentication of the first host 2 is unsuccessful (NO in step S103), the controller transmits an authentication result indicating failure of the authentication to the first host 2 (step S104) and the processing returns to step S101.

When the authentication of the first host 2 is successful (YES in step S103), the controller unlocks data read from the NAND flash memory on the basis of the setting change command (step S105). The controller generates an encryption key corresponding to the authentication information of the first host 2 (step S106), and sets the encryption key to an encryption circuit (step S107). The set encryption key is used for encryption and decryption of user data by the encryption circuit. The controller transmits an authentication result indicating success of the authentication to the first host 2 (step S108).

Next, the controller determines whether a read command has been received from any of the hosts 2 (step S109). When a read command has not been received from any of the hosts 2 (NO in step S109), the processing returns to step S109 to determine again whether a read command has been received.

On the other hand, when a read command has been received from a host 2 (hereinafter referred to as a second host) (YES in step S109), the controller reads encrypted user data from the NAND flash memory in accordance with the read command (step S110), and decrypts the encrypted user data with the encryption circuit to which the encryption key has been set (step S111). The controller transmits the decrypted user data to the second host 2 (step S112) and the processing returns to step S109. The second host 2 is any one of the hosts 2 connected to the SSD, and may be identical to the first host 2, or may be different from the first host 2. The procedures from step S109 to step S112 may be repeated until the SSD is powered off.

As described above, after the authentication of one host (in this case, the first host 2) is successful, all the hosts 2 connected to the SSD can read user data from the SSD by transmitting a read command. Thus, when the second host 2 that has transmitted a read command is different from the first host 2 whose authentication is successful, the second host 2, which has not been authenticated, may read user data from the SSD, resulting in leakage of the user data.

In contrast, FIG. 12 illustrates an example of procedure of read control processing performed by the controller 4 of the present embodiment. The controller 4 has a function of reading data from the NAND flash memory 5 in accordance with a read command from only a host 2 whose authentication is successful by using a temporary authentication code. Hereinafter, a case where a host 2 transmits a authentication request command and a setting change command for requesting to enable data read to the controller 4 will be exemplified.

First, the controller 4 determines whether TCG commands including the authentication request command and the setting change command have been received from any of the hosts 2 connected to the SSD 3 (step S201). When the TCG commands have not been received from any of the hosts 2 (NO in step S201), the processing returns to step S201 to determine again whether the TCG commands have been received.

On the other hand, when the TCG commands have been received from a host 2 (hereinafter referred to as a first host) (YES in step S201), the controller 4 performs authentication processing of the first host 2 by using authentication information of the first host 2 included in the authentication request command (step S202). The controller 4 determines whether the authentication of the first host 2 is successful in the authentication processing (step S203). When the authentication of the first host 2 is unsuccessful (NO in step S203), the controller 4 transmits an authentication result indicating failure of the authentication to the first host 2 (step S204) and the processing returns to step S201. When the number of successive authentication failures exceeds a specific number, the controller 4 may be configured not to accept an authentication request command any more.

When the authentication of the first host 2 is successful (YES in step S203), the controller 4 unlocks data read from the NAND flash memory 5 on the basis of the setting change command (step S205). The controller 4 generates an encryption key 22 corresponding to the authentication information of the first host 2 and a temporary authentication code 23 (step S206). The temporary authentication code 23 includes, for example, a random number, or a random number and an identifier of the first host 2. The controller 4 sets the generated encryption key 22 to the encryption circuit 15 (step S207). The set encryption key 22 is used for encryption and decryption of user data by the encryption circuit 15. The controller 4 transmits an authentication result indicating success of the authentication and the generated temporary authentication code 23 to the first host 2 (step S208).

Next, the controller 4 determines whether a read command has been received from any of the hosts 2 (step S209). When a read command has not been received from any of the hosts 2 (NO in step S209), the processing returns to step S209.

When a read command has been received from a host 2 (hereinafter referred to as a second host) (YES in step S209), the controller 4 determines whether the temporary authentication code 23 generated in step S206 matches a temporary authentication code included in the read command (step S210). The second host 2 is any one of the hosts 2 connected to the SSD 3.

When the generated temporary authentication code 23 is different from the temporary authentication code in the read command (NO in step S210), the controller 4 notifies the second host 2 of an error (step S211) and the processing returns to step S209. When the number of successive occurrences of errors due to mismatch of temporary authentication codes exceeds a specific number, the controller 4 may be configured not to accept a read command any more.

On the other hand, when the generated temporary authentication code 23 matches the temporary authentication code in the read command (YES in step S210), the controller 4 reads encrypted user data from the NAND flash memory 5 in accordance with the read command (step S212). The controller 4 decrypts the encrypted user data with the encryption circuit 15 to which the encryption key 22 has been set (step S213). The controller 4 transmits the decrypted user data to the second host 2 (step S214) and the processing returns to step S209. The procedures from step S209 to step S214 may be repeated until the SSD 3 is powered off.

As described above, the temporary authentication code 23 is transmitted to one host (in this case, the first host 2) whose authentication is successful, and user data is read from the NAND flash memory 5 in accordance with only the read command including the temporary authentication code 23. That is, when a read command not including the temporary authentication code 23 is accepted, user data is not read from the SSD 3.

Thus, by using the temporary authentication code 23 transmitted to the first host 2 whose authentication has been successful, only the second host 2 having the temporary authentication code 23 (that is, the second host 2 identical to the first host 2) is enabled to read user data from the SSD 3. In contrast, the second host 2 not having the temporary authentication code 23 (that is, the second host 2 different from the first host 2) is disabled to read user data from the SSD 3. This makes it possible to prevent the unauthenticated host 2 that does not have correct authentication information from reading user data in the SSD 3 and from leaking the user data.

Write control processing performed by a controller in a memory system of a comparative example that does not use a temporary authentication code will be explained with reference to a flowchart of FIG. 13, and write control processing performed by the controller 4 of the present embodiment that uses a temporary authentication code will be explained with reference to a flowchart of FIG. 14.

Figure 13:
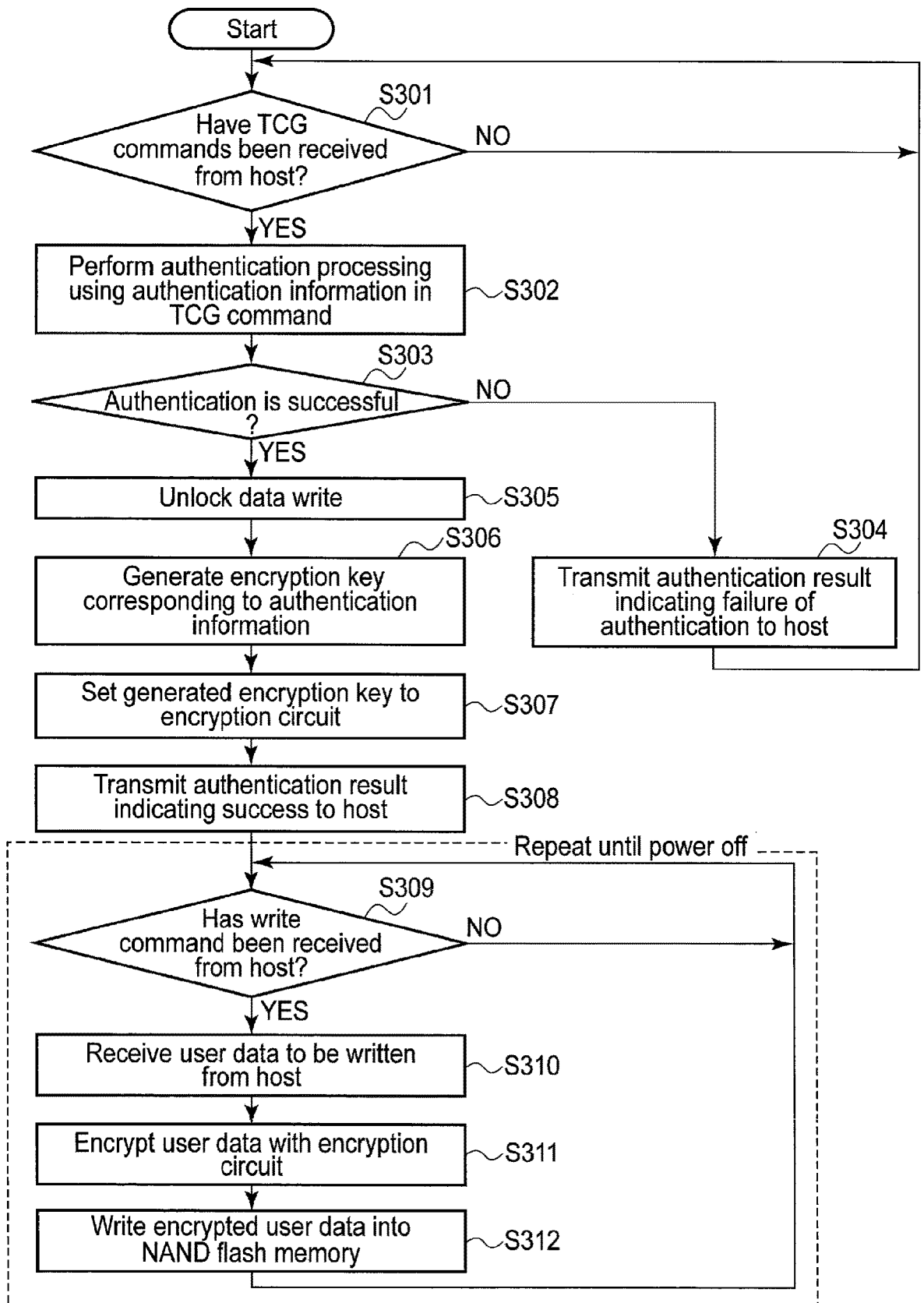
FIG. 13 is a flowchart illustrating an example of the procedure of write control processing performed in the memory system of the comparative example.

FIG. 13 illustrates an example of the procedure of the write control processing by the controller that does not use a temporary authentication code. The controller is configured to process access commands from all connected hosts after the authentication of one of the hosts is successful. A case where an authentication request command and a setting change command requesting to enable data write are transmitted from one of the hosts 2 connected to the SSD that includes the controller will be exemplified. The procedures from step S301 to step S304 are the same as the procedures from step S101 to step S104 described above with reference to the flowchart of FIG. 11.

When the authentication of the first host 2 is successful (YES in step S303), the controller unlocks data write into the NAND flash memory on the basis of the setting change command (step S305). The controller generates an encryption key corresponding to the authentication information of the first host 2 (step S306), and sets the encryption key to the encryption circuit (step S307). The set encryption key is used for encryption and decryption of user data by the encryption circuit. The controller transmits an authentication result indicating success of the authentication to the first host 2 (step S308).

Next, the controller determines whether a write command has been received from any of the hosts 2 (step S309). When a write command has not been received from any of the hosts 2 (NO in step S309), the processing returns to step S309.

On the other hand, when a write command has been received from a host 2 (hereinafter referred to as a second host) (YES in step S309), the controller receives user data to be written from the second host 2 (step S310). The controller encrypts the received user data with the encryption circuit to which the encryption key has been set (step S311). The controller writes the encrypted user data into the NAND flash memory (step S312) and the processing returns to step S309. The second host 2 is any one of the hosts 2 connected to the SSD, and may be identical to the first host 2, or may be different from the first host 2. The procedures from step S309 to step S312 may be repeated until the SSD is powered off.

As described above, after the authentication of one host (in this case, the first host 2) has been successful, all the hosts 2 connected to the SSD can write data into the SSD by transmitting a write command. Thus, even when the second host 2 that has transmitted a write command is a host different from the first host 2 whose authentication is successful, the second host 2, which has not been authenticated, may write user data into the SSD, resulting in alteration of data in the SSD.

Figure 14:
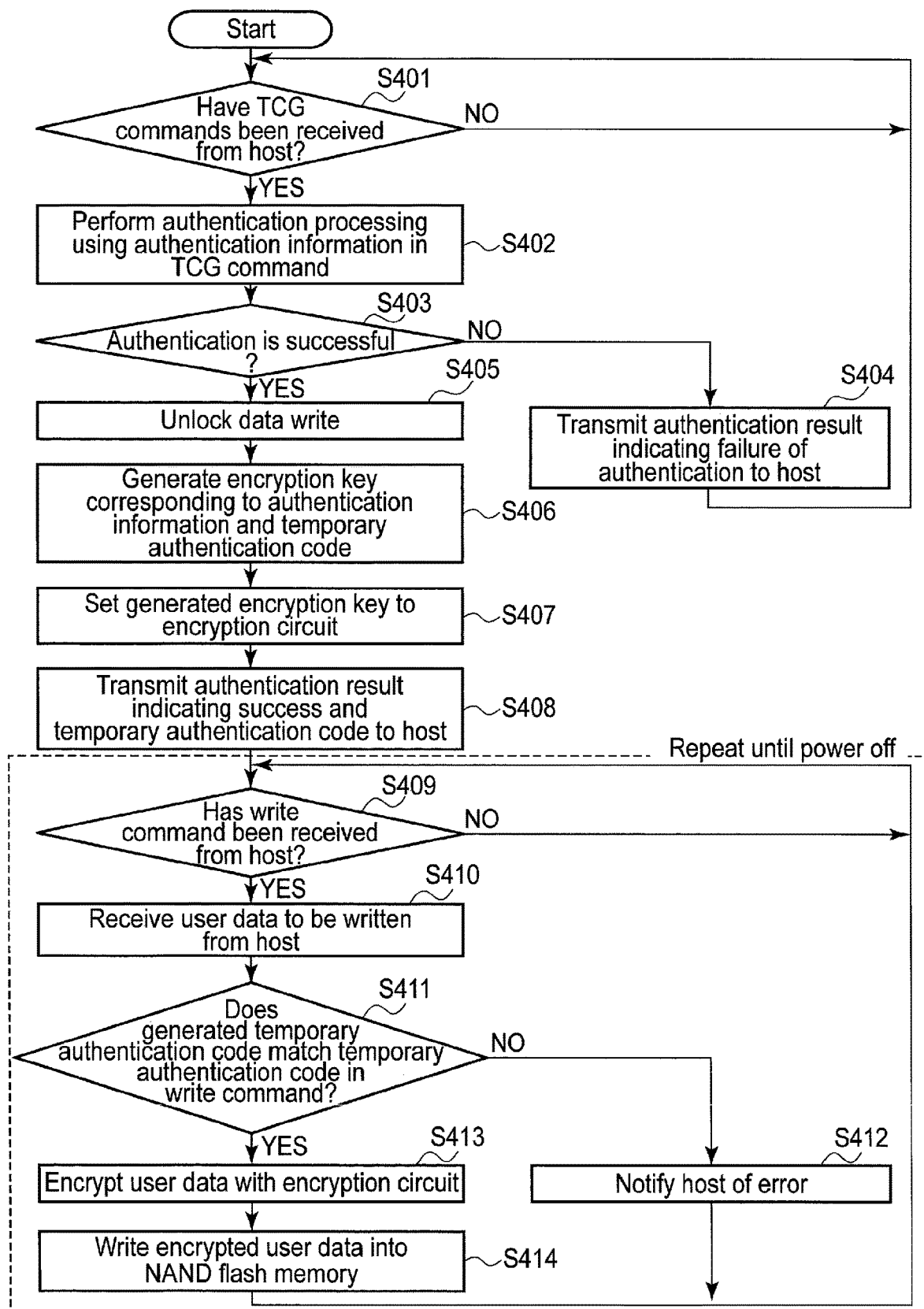
FIG. 14 is a flowchart illustrating an example of the procedure of write control processing performed in the memory system of the embodiment.

In contrast, FIG. 14 illustrates an example of procedure of write control processing performed by the controller 4 of the present embodiment. The controller 4 has a function of writing data into the NAND flash memory 5 in accordance with a write command only from a host 2 whose authentication has been successful. Hereinafter, a case where the host 2 transmits an authentication request command and a setting change command for requesting to enable data write to the controller 4 will be exemplified. The procedures from step S401 to step S404 are the same as the procedures from step S201 to step S204 described above with reference to the flowchart of FIG. 12.

When the authentication of the first host 2 is successful (YES in step S403), the controller 4 unlocks the data write into the NAND flash memory 5 on the basis of the setting change command (step S405). The controller 4 generates an encryption key 22 corresponding to the authentication information of the first host 2, and a temporary authentication code 23 (step S406). The temporary authentication code 23 includes, for example, a random number, or a random number and an identifier of the first host 2. The controller 4 sets the generated encryption key 22 to the encryption circuit 15 (step S407). The set encryption key 22 is used for encryption and decryption of user data by the encryption circuit 15. The controller 4 transmits an authentication result indicating success of the authentication and the generated temporary authentication code 23 to the first host 2 (step S408).

Next, the controller 4 determines whether a write command has been received from any of the hosts 2 (step S409). When a write command has not been received from any of the hosts 2 (NO in step S409), the processing returns to step S409.

When a write command has been received from a host 2 (hereinafter referred to as a second host) (YES in step S409), the controller 4 receives user data to be written from the second host 2 (step S410). The second host 2 is any one of the hosts 2 connected to the SSD 3. The controller 4 determines whether the temporary authentication code 23 generated in step S406 matches a temporary authentication code included in the write command (step S411).

When the generated temporary authentication code 23 is different from the temporary authentication code in the write command (NO in step S411), the controller 4 notifies the second host 2 of an error (step S412) and the processing returns to step S409. Note that when the number of successive occurrences of errors due to mismatch of the temporary authentication codes exceeds a specific number, the controller 4 may be configured not to accept a write command any more.

On the other hand, when the generated temporary authentication code 23 matches the temporary authentication code in the write command (YES in step S411), the controller 4 encrypts the received user data with the encryption circuit 15 to which the encryption key 22 has been set (step S413). The controller 4 writes the encrypted user data into the NAND flash memory 5 (step S414) and the processing returns to step S409. The procedures from step S409 to step S414 may be repeated until the SSD 3 is powered off.

As described above, the temporary authentication code 23 is transmitted to one host (in this case, the first host 2) whose authentication has been successful, and user data is written into the SSD 3 in accordance with only a write command including the temporary authentication code 23. That is, when a write command not including the temporary authentication code 23 is received, data is not written into the SSD 3.

Thus, by using the temporary authentication code 23 transmitted to the first host 2 whose authentication has been successful, only the second host 2 having the temporary authentication code 23 (that is, the second host 2 identical to the first host 2) is enabled to write data into the SSD 3. In contrast, the second host 2 not having the temporary authentication code 23 (that is, the second host 2 different from the first host 2) is disabled to write data into the SSD 3. This makes it possible to prevent the unauthenticated host 2, which does not have correct authentication information, from writing data into the SSD 3 and from altering data in the SSD 3.

As described above, according to the present embodiment, security for access to storage can be enhanced. The TCG command processing module 124 receives an authentication request command from the first host 2, and transmits a first authentication code to the first host 2 when authentication of the first host 2 using authentication information included in the authentication request command is successful. The read/write command processing module 121 receives an access command for accessing the NAND flash memory 5 from the second host 2, permits the access to the NAND flash memory 5 in accordance with the access command when a second authentication code in the access command matches the first authentication code, and prohibits the access to the NAND flash memory 5 in accordance with the access command when the second authentication code is different from the first authentication code.

Therefore, since only the host 2 having a correct temporary authentication code can access the NAND flash memory 5 by using an access command, the security for the access to the NAND flash memory 5 can be enhanced.

Each of various functions described in some embodiments of the present invention may be realized by a circuit (e.g., a processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system communicable with a plurality of hosts, the memory system comprising:
    a nonvolatile memory; and
    a controller electrically connected to the nonvolatile memory and configured to:
    encrypt data to be written into the nonvolatile memory;
    decrypt data read from the nonvolatile memory;
    receive an authentication request command from a first host;
    transmit a first authentication code to the first host upon authentication of the first host being successful; and
    receive an access command, which includes a second authentication code, for accessing the nonvolatile memory from a second host,
    wherein the controller is configured to:
        compare the received second authentication code with the transmitted first authentication code; and
        in a case where the second authentication code matches the first authentication code, permit an access to the nonvolatile memory in accordance with the access command; and
        in a case where the second authentication code is different from the first authentication code, prohibit an access to the nonvolatile memory in accordance with the access command.

2. The memory system of claim 1, wherein
    the access command is a read command that requests to read first data from the nonvolatile memory, and
    in a case where the second authentication code in the read command matches the first authentication code, the controller reads the first data from the nonvolatile memory, decrypts the first data, and transmit the decrypted first data to the second host, and
    in a case where the second authentication code is different from the first authentication code, the controller does not read the first data from the nonvolatile memory.

3. The memory system of claim 2, wherein
    the authentication request command includes authentication information, and
    in a case where the authentication of the first host using the authentication information is successful, the controller generates an encryption key corresponding to the authentication information, and
    in a case where the second authentication code matches the first authentication code, the controller decrypts the first data with the encryption key.

4. The memory system of claim 1, wherein
    the access command is a write command that requests to write second data into the nonvolatile memory, and
    in a case where the second authentication code in the write command matches the first authentication code, the controller encrypts the second data and writes the encrypted second data into the nonvolatile memory, and
    in a case where the second authentication code is different from the first authentication code, the controller does not write the second data into the nonvolatile memory.

5. The memory system of claim 4, wherein
    the authentication request command includes authentication information, and
    in a case where the authentication of the first host using the authentication information is successful, the controller generates an encryption key corresponding to the authentication information, and
    in a case where the second authentication code matches the first authentication code, the controller encrypts the second data with the encryption key.

6. The memory system of claim 1, wherein
    the first authentication code includes a random number.

7. The memory system of claim 1, wherein
    the first authentication code includes a random number and an identifier of the first host.

8. The memory system of claim 1, wherein
    in a case where the authentication of the first host is unsuccessful, the controller does not transmit the first authentication code to the first host.

9. The memory system of claim 1, wherein
    the authentication request command includes encrypted authentication information, and
    the controller is configured to decrypt the encrypted authentication information, and transmit the first authentication code to the first host upon the authentication of the first host using the decrypted authentication information being successful.

10. The memory system of claim 9, wherein
    the controller is configured to transmit the first authentication code that is encrypted to the first host upon the authentication of the first host being successful.

11. The memory system of claim 1, wherein
    the second authentication code included in the access command is encrypted, and
    the controller is configured to:
    decrypt the encrypted second authentication code;
    in a case where the decrypted second authentication code matches the first authentication code, permit the access to the nonvolatile memory; and
    in a case where the decrypted second authentication code is different from the first authentication code, prohibit the access to the nonvolatile memory.

12. The memory system of claim 1, wherein
    the memory system conforms to a Trusted Computing Group (TCG) standard.

13. A method of controlling a memory system, the memory system including a nonvolatile memory, the method comprising:
    encrypting data to be written into the nonvolatile memory;
    receiving an authentication request command from a first host;
    transmitting a first authentication code to the first host upon authentication of the first host being successful;
    receiving an access command, which includes a second authentication code, for accessing the nonvolatile memory from a second host;
    comparing the received second authentication code with the transmitted first authentication code; and in a case where the second authentication code matches the first authentication code, permitting an access to the nonvolatile memory in accordance with the access command; and in a case where the second authentication code is different from the first authentication code, prohibiting an access to the nonvolatile memory in accordance with the access command.

14. The method of claim 13, wherein
the access command is a read command that requests to read first data from the nonvolatile memory, and
the method further comprises:
in a case where the second authentication code in the read command matches the first authentication code, reading the first data from the nonvolatile memory, decrypting the first data, and transmitting the decrypted first data to the second host; and
in a case where the second authentication code is different from the first authentication code, not reading the first data from the nonvolatile memory.

15. The method of claim 14, wherein
the authentication request command includes authentication information, and
the method further comprises:
in a case where the authentication of the first host using the authentication information is successful, generating an encryption key corresponding to the authentication information; and
in a case where the second authentication code matches the first authentication code, decrypting the first data with the encryption key.

16. The method of claim 13, wherein
the access command is a write command that requests to write second data into the nonvolatile memory, and
the method further comprises:
in a case where the second authentication code in the write command matches the first authentication code, encrypting the second data and writing the encrypted second data into the non volatile memory; and in a case where the second authentication code is different from the first authentication code, not writing the second data into the nonvolatile memory.

17. The method of claim 16, wherein
the authentication request command includes authentication information, and
the method further comprises:
in a case where the authentication of the first host sing the authentication information is successful, generating an encryption key corresponding to the authentication information; and
in a case where the second authentication code matches the first authentication code, encrypting the second data with the encryption key.

18. The method of claim 13, wherein
the authentication request command includes encrypted authentication information, and
the method further comprises decrypting the encrypted authentication information, and transmitting the first authentication code to the first host upon the authentication of the first host using the decrypted authentication information being successful.

19. The method of claim 18, further comprising
transmitting the first authentication code that is encrypted to the first host upon the authentication of the first host being successful.

20. The method of claim 13, wherein
the second authentication code included in the access command is encrypted, and
the method further comprises:
decrypting the encrypted second authentication code;
in a case where the decrypted second authentication code matches the first authentication code, permitting the access to the nonvolatile memory; and
in a case where the decrypted second authentication code is different from the first authentication code, prohibiting the access to the nonvolatile memory.

* * * * *

UNITED STATES PATENT AND TRADEMARK OFFICE
CERTIFICATE OF CORRECTION

| | |
|---|---|
| PATENT NO. | : 11,362,830 B2 |
| APPLICATION NO. | : 16/517906 |
| DATED | : June 14, 2022 |
| INVENTOR(S) | : Yuki Kanbe |

It is certified that error appears in the above-identified patent and that said Letters Patent is hereby corrected as shown below:

On the Title Page

Item (71), the Applicant's name is incorrect.
Item (71) should read:
--(71) Applicant: Kioxia Corporation, Tokyo (JP)--

Signed and Sealed this
Eighteenth Day of October, 2022

Katherine Kelly Vidal
*Director of the United States Patent and Trademark Office*